United States Patent
Carson et al.

(10) Patent No.: US 6,468,646 B2
(45) Date of Patent: *Oct. 22, 2002

(54) MULTI-PURPOSE ABSORBENT AND CUT-RESISTANT SHEET MATERIALS

(75) Inventors: John Kit Carson, Liberty Township, OH (US); John David Norcom, West Chester, OH (US); Richard Tweddell, III, Cincinnati, OH (US); Geneva Gail Otten, Cincinnati, OH (US); Steven Michael Schennum, West Chester, OH (US); Peter Worthington Hamilton, Cincinnati, OH (US); Richard Emil Hildebrand, IV, West Chester, OH (US); Kenneth Stephen McGuire, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/997,381

(22) Filed: Nov. 29, 2001

(65) Prior Publication Data

US 2002/0061386 A1 May 23, 2002

Related U.S. Application Data

(63) Continuation of application No. 09/560,069, filed on Apr. 27, 2000, now Pat. No. 6,383,614, which is a continuation-in-part of application No. 09/336,496, filed on Jun. 18, 1999, now abandoned.

(51) Int. Cl.$^7$ .................................................. B32B 3/26

(52) U.S. Cl. ..................................... 428/315.9; 428/221

(58) Field of Search ............................... 428/315.9, 221

(56) References Cited

U.S. PATENT DOCUMENTS

| | | | |
|---|---|---|---|
| 2,962,414 A | | 11/1960 | Araledter |
| 2,962,415 A | | 11/1960 | Arledter |
| 3,184,373 A | | 5/1965 | Arledter |
| 3,325,345 A | | 6/1967 | Hider |
| 3,704,023 A | * | 11/1972 | Downs ........................ 156/335 |
| 3,888,248 A | * | 6/1975 | Moore et al. ................ 128/156 |
| 3,937,648 A | | 2/1976 | Huebner et al. |
| 4,225,383 A | | 9/1980 | McReynolds |
| 4,311,479 A | | 1/1982 | Fenn et al. |
| 4,328,275 A | | 5/1982 | Vargo |
| 4,379,808 A | | 4/1983 | Cole et al. |
| 4,614,679 A | | 9/1986 | Farrington, Jr. et al. |
| 4,769,109 A | | 9/1988 | Tellvik et al. |
| 4,769,274 A | | 9/1988 | Tellvik et al. |
| 4,865,855 A | | 9/1989 | Hansen et al. |
| 4,878,765 A | | 11/1989 | Watkins et al. |

(List continued on next page.)

Primary Examiner—Cathy Lam
(74) Attorney, Agent, or Firm—Peter D. Meyer

(57) ABSTRACT

A multi-purpose sheet material comprising an absorbent layer and a cut-resistant material in contact with the absorbent layer. The cut-resistant material can comprise a cut-resistant support system, such as cut-resistant support element formed in the absorbent layer for example. The cut-resistant material may alternatively comprise cut-resistant particles, such as polymer particles having an average size of at least about 100 micrometers for example. Preferably, the sheet material exhibits an absorbent efficiency of at least about 0.2 and a slice resistance of at least about 30 kgf/cm, and more preferably an absorbent efficiency of at least about 1.0 and a slice resistance of at least about 40 kgf/cm. It is also preferred that sheet material exhibit a cut-resistance of at least about 30 kgf/cm, an absorbent efficiency of at least about 0.2, and a wet abrasion loss of less than about 400 mg per 100 revolutions.

20 Claims, 10 Drawing Sheets

U.S. PATENT DOCUMENTS

| | | | |
|---|---|---|---|
| 4,957,805 A | 9/1990 | Biggs et al. | |
| 5,093,164 A | 3/1992 | Bauer et al. | |
| 5,215,627 A | 6/1993 | Willis et al. | |
| 5,336,555 A * | 8/1994 | Darras et al. | 428/247 |
| 5,338,406 A | 8/1994 | Smith | |
| 5,414,248 A | 5/1995 | Phillips | |
| 5,480,693 A | 1/1996 | Patterson et al. | |
| 5,501,886 A | 3/1996 | Hammer et al. | |
| 5,536,555 A | 7/1996 | Zelazoski et al. | |
| 5,580,423 A | 12/1996 | Ampulski et al. | |
| 5,607,745 A | 3/1997 | Ogden | |
| 5,613,427 A | 3/1997 | Wiley | |
| 5,662,758 A | 9/1997 | Hamilton et al. | |
| 5,709,897 A | 1/1998 | Pearlstein | |
| 5,714,229 A | 2/1998 | Ogden | |
| 5,718,955 A | 2/1998 | McGuire et al. | |
| 5,804,241 A | 9/1998 | Isohata | |
| 5,833,894 A | 11/1998 | Lanzani et al. | |
| 5,888,604 A | 3/1999 | Evans, Jr. et al. | |
| 5,925,406 A | 7/1999 | McGuire et al. | |
| 5,965,235 A | 10/1999 | McGuire et al. | |
| 6,021,524 A * | 2/2000 | Wu et al. | 2/167 |
| 6,037,022 A | 3/2000 | Adur et al. | |
| 6,080,474 A * | 6/2000 | Oakley et al. | 428/323 |
| 6,274,232 B1 * | 8/2001 | Otten et al. | 428/315.9 |

* cited by examiner

| Sheet No. | Absorbent Material | Cut Resistant Particle type | Average Particle type | Particle loading | Sheet Basis Weight (g/cm²) | Sheet Thickness (in) |
|---|---|---|---|---|---|---|
| 1 | 75/25 SSK/EUC | PETG | 300 | 30% | 0.05 | 0.0248 |
| 2 (3 layers) | layer 1 - 100% SSK<br>layer 2 - 75/25% SSK/Euc<br>layer 3 - 100% SSK | PETG | 300 | layer 1 - 0%<br>layer 2 - 38%<br>layer 3 - 0% | | |
| 3 | 75/25 SSK/Euc | PETG | 220 | 30% | 0.053 | 0.0267 |
| 4 (Control Sample) | 75/25 SSK/Euc | N/A | N/A | N/A | 0.054 | 0.0241 |
| 5 | 75/25 SSK/Euc | PETG | 300 | 30% | 0.052 | 0.0254 |
| 6 | 75/25 SSK/Euc | PETG | 220 | 30% | 0.037 | 0.0177 |
| | | | | | 0.029 | 0.0127 |

Fig. 17A

| Absorbent Capacity (g/cm²) | Absorbent Rate (g/s) | Absorbent Efficiency | Slice Resistance (kgf/cm) | Abrasion Loss-dry (mg/100 rev) | Abrasion Loss-wet (mg/100 rev) |
|---|---|---|---|---|---|
| 0.042 | 0.129 | 3.675 | 59.05 | 94.5 | 224.25 |
| 0.048 | 0.160 | 4.919 | 49.49 | 207 | 367 |
| 0.038 | 0.086 | 2.324 | 53.35 | 73.5 | 61.75 |
| 0.061 | 0.200 | 8.081 | 49.21 | 372.3 | 547.25 |
| 0.029 | 0.089 | 2.460 | 38.34 | 94.75 | 223.75 |
| 0.028 | 0.082 | 3.046 | 49.21 | 63.75 | 304 |

Fig. 17B

MULTI-PURPOSE ABSORBENT AND CUT-RESISTANT SHEET MATERIALS

RELATED APPLICATION

This application is a continuation of application Ser. No. 09/560,069, filed Apr. 27, 2000 now U.S. Pat. No. 6,383,614 which is a continuation-in-part of application Ser. No. 09/336,496, filed on Jun. 18, 1999; now abandoned, the entire disclosures of which are hereby incorporated herein by reference.

TECHNICAL FIELD

The present invention relates to sheet materials which are suitable for protecting a supporting surface from various articles and/or substances placed thereon and vice-versa. The present invention further relates to such sheet materials which are also capable of absorbing and/or containing various liquids which may be carried by or exuded from such various articles and/or substances and protecting the supporting surface from these liquids.

BACKGROUND OF THE INVENTION

Sheet-like materials for use in protecting objects or substances from a supporting surface, and/or protecting supporting surfaces from objects or substances, are well known in the art. Such materials can be utilized to provide a permanent form of protection, but most commonly are situation- or task-oriented and are only required or utilized for a limited period of time and then disposed of.

One common scenario for the use of such sheet materials is the preparation of food items for consumption, such as the preparing of certain meat products for cooking. Protective sheet materials in this scenario may provide dual protective functions in protecting the food item from soiling and other contamination from a supporting surface such as a countertop as well as protecting the countertop from soiling due to blood, water, and other fluids and substances present on the surface of the food item. Protective sheet materials may also protect a supporting surface from physical damage such as impact from a sharp object or cutting device such as a knife or cleaver used in such food preparation.

Typically, however, the consumer is faced with a paradox in selecting an appropriate sheet material for use in such a food preparation scenario. Sheet materials which are comparatively high in absorbency, such as paper-based materials, typically are comparatively low in cut-resistance, while those which are comparatively high in cut-resistance, such as plastic sheet materials, are comparatively low in absorbency.

Accordingly, it would be desirable to provide a sheet material which is both comparatively high in absorbency and comparatively high in cut-resistance, yet also comparatively thin, light, and flexible so as to be easily disposed of. It is also desirable to provide such a material which is also high in shred resistance.

It would further be desirable to provide such a sheet material which, while durable in use, may be so readily and economically manufactured so as to be disposed of after use.

SUMMARY OF THE INVENTION

It is an object of the present invention to obviate the above-described problems.

Another object of the present invention is to provide a disposable and protective cutting sheet.

It is a further object of the invention to provide a sheet material that is absorbent, cut-resistant, and shred resistant.

To achieve the foregoing and other objectives, a multi-purpose sheet material is provided comprising an absorbent layer and a cut-resistant material in contact with the absorbent layer. The cut-resistant material can comprise a cut-resistant support system, such as discrete cut-resistant support elements formed within the absorbent layer for example. The cut-resistant material may alternatively comprise cut-resistant particles, such as polymer particles having an average size of at least about 100 micrometers for example, which are dispersed throughout the absorbent layer. Preferably, the sheet material exhibits an absorbent efficiency of at least about 0.2 and a slice resistance of at least about 30 kgf/cm, and more preferably an absorbent efficiency of at least about 1.0 and a slice resistance of at least about 40 kgf/cm. It is also preferred that sheet material exhibit a cut-resistance of at least 30 kgf/cm, an absorbent efficiency of at least 0.2, and a wet abrasion loss of less than about 400 mg per 100 revolutions.

Still other objects of the present invention will become apparent to those skilled in the art from the following description wherein there is shown and described preferred embodiments of this invention, including a best mode currently contemplated for carrying out this invention, simply for the purposes of illustration. As will be realized, the invention is capable of other different aspects and embodiments without departing from the scope of the invention. Accordingly, the drawings and descriptions are illustrative in nature and not restrictive in nature.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 17 is a data table illustrating preferred properties of sheet materials made in accordance with principles of the present invention.

DETAILED DESCRIPTION OF PREFERRED EMBODIMENTS

Figure 1:
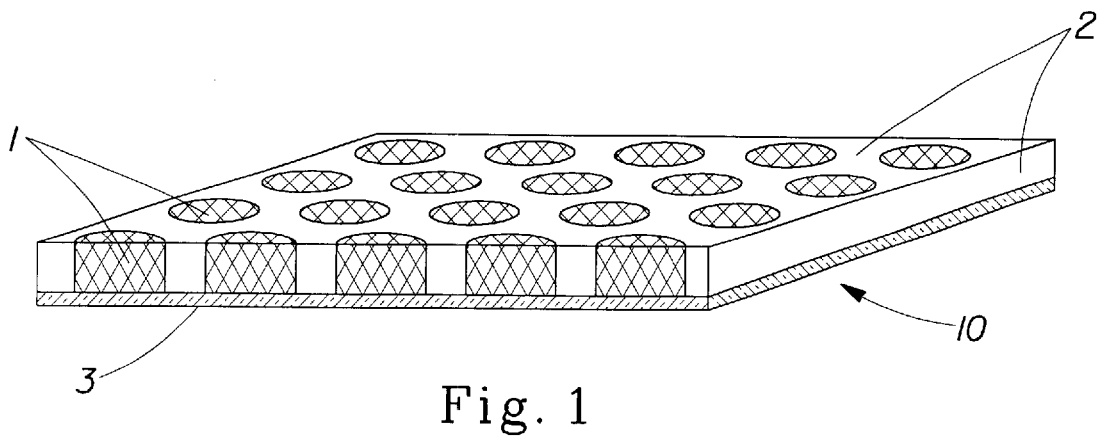
FIG. 1 is a partially-segmented perspective view of one embodiment of a multi-purpose absorbent and cut-resistance sheet material according to the present invention.

As utilized herein, the term "absorbent efficiency" is used to refer to a derived parameter which has been found useful to characterize sheet materials and determine whether they perform satisfactorily in the food preparation environment. The absorbent efficiency takes both absorption rate and capacity into account.

In a disposable food preparation mat, it is desirable to have a mat that absorbs a sufficient quantity of fluid in a reasonable period of time. It is also desirable for the mat to be relatively thin (most preferably 0.076 cm) to maintain good conformability to the work surface and to have an impression of disposability. An absorbent efficiency can then be defined as:

$$\text{Efficiency} = \frac{\text{Capacity} \cdot \text{Rate}}{\text{thickness}} * 10^4$$

where capacity has units of $$\frac{g_{water}}{cm^2},$$

rate has units of $$\frac{g_{water}}{s \cdot cm^2},$$

thickness has units of cm, and the absorbent efficiency has units of $$\left(\frac{g_{water}}{cm^2}\right)\left(\frac{g_{water}}{s \cdot cm^2}\right)\left(\frac{1}{cm}\right).$$

Hence, the absorbent efficiency is maximized by maximizing the absorbent capacity and rate, and by minimizing the mat thickness.

A typical practice in preparing food is slicing fruit. As most fruits are sliced, they exude aqueous juices. Especially juicy fruits-oranges for example-may exude up to 10 g of juice per fruit. It is desirable that the food preparation mat entirely absorb all 10 g of this juice within 30 seconds to facilitate clean disposal of the mat. A typical food preparation mat has an area of approximately 650 cm² and is most preferably 0.076 cm thick. Thus, it is preferred that a food preparation mat have an absorbent efficiency as defined above of at least 0.2, and more preferably greater than at least 1.0.

As utilized herein, the term "slice resistance" is used to refer to a derived parameter which has been found useful to characterize sheet materials and determine whether they perform satisfactorily in the food preparation environment.

Based on extensive consumer testing, a food preparation mat must have a slice resistance of at least 2.27 kgf (5 lbf), as measured using the slice resistance test discussed below, so that an average consumer will not cut through the protective surface during a single use. In addition the thickness of the kitchen food preparation mat should be minimized to reduce waste, increase the consumers' likelihood to dispose of the sheet, and make the sheet easier to store. Therefore the thickness of the food preparation sheet should be less than 0.254 cm (0.100 in), more preferably less than 0.127 cm (0.050 in), most preferably less than 0.076 cm (0.030 in). In order for a structure to provide a slice resistance of at least 2.27 kgf (5 lbf) at the maximum most preferable thickness of 0.076 cm (0.030 in), the structure must have a minimum unit slice resistance of 30 kgf/cm (2.27 kgf/0.076 cm=30 kgf/cm), and more preferably a minimum unit slice resistance of 40 kgf/cm.

FIG. 1 depicts one embodiment of a multi-purpose sheet material 10 in accordance with the present invention. Sheet material 10 includes a fluid absorbent layer 2 which forms a fluid reservoir, a fluid-impervious backing layer 3, and a cut-resistant reinforcing system comprising a plurality of individual reinforcing elements 1 which extend continuously from the backing layer 3 though the absorbent layer 2 to the surface of the absorbent layer. Sheet material 10 is shown in an orientation suitable for placement upon a supporting surface (not shown), such as a countertop or table, with the backing layer 3 in contact with the supporting surface and the reinforcing elements facing outwardly from the supporting surface. Sheet material 10 may also include an optional adhesive system (not shown) on the outwardly-facing surface of the barrier or backing layer 3 which would be placed in contact with a supporting surface.

The sheet material 10 comprises a generally planar sheet-like structure of the desired planar dimensions and having two opposed principal surfaces which are likewise substantially planar. "Layers" of such a sheet material are also typically substantially planar and/or define planes of contacting surfaces. Backing layer 3 fully covers one surface of the absorbent layer 2, such that any fluids contained therein cannot pass through the backing layer 3 and onto any supporting surface upon which the sheet material 10 is placed. Reinforcing elements 1 extend across the surface of the absorbent layer 2 opposite from the backing layer 3, in the embodiment shown forming a regular repeating pattern of elements.

The absorbent layer may be formed from any material or materials suitable for absorbing and/or containing any fluid(s) of interest. Suitable materials include fibrous webs or sheets of material formed from fibers of natural (cellulosic, etc.) and/or synthetic origin, including hollow fibers and capillary channel fibers, absorbent polymeric foams, absorbent polymeric gelling materials, hydrogels, natural starches and gums, etc. or combinations thereof.

Materials of particular interest include cellulosic substrates such as paperboard. The absorbent layer may comprise one monolithic layer of material or may comprise a laminate structure having multiple layers of the same or diverse composition. In addition, the absorbent layer may comprise a carrier web that itself may or may not be absorbent, but may carry an absorbent material. The role of the absorbent layer in the sheet materials of the present invention is to absorb and sequester fluids.

The backing layer may be formed from any material or materials suitable for forming a continuous layer or coating on a surface of the absorbent layer which is impervious to fluids of interest. Suitable materials include polymeric films bonded or laminated to the absorbent layer, thermoplastic resins directly cast or extruded onto the absorbent layer, metallic foils, or other impervious coatings printed, sprayed, or otherwise topically applied, etc. The backing layer may comprise one monolithic layer of material or may comprise a laminate structure having multiple layers of the same or diverse composition.

The optional adhesive system may comprise a zonal, patterned, discrete, or continuous coating or layer of a pressure sensitive adhesive or any other adhesive system known in the art to provide for an adhesive force between the sheet material 10 and a supporting surface. This optional feature provides additional lateral stability over and above the friction between the backing layer and the supporting surface. Release liners or other configurations may be desired depending upon the tack of the adhesive and/or the construction of the sheet material. Other configurations may utilize a non-adherent but comparatively high coefficient of friction material which resists sliding upon most typical supporting surfaces.

The reinforcing system may be formed from any material or materials suitable for forming a continuous network or a discontinuous array of discrete elements of the desired size, shape, and spacing. In accordance with the present invention, the reinforcing system is preferably substantially non-absorbent and substantially impervious to the fluid(s) of interest. In a preferred embodiment, the reinforcing system is formed from and/or treated with a material which tends to repel the fluids of interest rather than being wetted by them, such as hydrophobic, lipophobic, or other types of materials. For other applications the reinforcing system may be formed from and/or treated with a material which tends to cause the fluids of interest to "wet out" on the surface, such as hydrophilic, lipophilic, or other types of materials. Suitable reinforcing materials include polymeric film bonded or laminated to the absorbent layer, thermoplastic, thermoset, or crosslinked resins or thermoset foams directly cast, printed, or extruded onto the absorbent layer, coated paper or cardboard bonded to the absorbent layer by adhesives or the like, etc. The reinforcing system may comprise one monolithic layer of material or may comprise a laminate structure having multiple layers of the same or diverse composition. Reinforcing systems may have any desired caliper suitable for a particular application.

In use, the sheet material is placed upon a supporting surface such as a countertop, tabletop, or floor surface and an object or substance is placed thereon. The object or substance may be a food item or any other item of interest which is to be manipulated or otherwise handled or treated during the course of any operation. The sheet material could also be utilized for storage of an object to collect residual fluids such as in the case of thawing frozen foods. After use or when the absorbent layer has become sufficiently contaminated or saturated with fluids, the sheet material may be disposed of in a responsible manner.

The sheet material is preferably sufficiently flexible and conformable such that it will conform to somewhat irregular or profiled supporting surfaces. For certain dispensing or packaging configurations, it may also be desirable for the sheet material to be sufficiently conformable in one or more directions such that it may be rolled upon itself to form a more compact configuration. Selection of materials for respective elements of the sheet material, as well as maintaining a comparatively low bending modulus via appropriate structural design (small cross-section, minimal thickness normal to the plane of the sheet material, discontinuous pattern, etc.), aids in obtaining the desired degree of flexibility. Weakened zones or lines, such as score lines, may be employed if desired to add additional flexibility and/or to promote folding or bending in certain directions or regions.

Additional absorbent capacity and protection of underlying and surrounding surfaces may also be provided in the form of a highly absorbent border at the periphery of the sheet material, a lip around the marginal edge, or other suitable techniques.

If desired for particular applications, the absorbent layer or any other elements of the sheet material of the present invention may contain or incorporate certain active materials which act upon the object or substance placed upon the sheet material, and/or upon the fluids carried by or exuded from the object or substance. Such actives may comprise agents intended to neutralize, sequester, disinfect, deodorize, or otherwise modify the properties of solid or liquid materials or the atmospheric environment surrounding the sheet material during use. Particular agents of interest would be those which modify the behavior of fluids such as aqueous fluids, blood-based fluids, oils, etc. Typical properties which may be desirable for certain applications are deodorant properties, antimicrobial properties, coagulating properties, etc. Exemplary materials include baking soda, fibrinogen, and other materials in suitable form for inclusion.

It may be desirable for certain applications to include a color-changing feature to the protective sheet to indicate a change in condition of the sheet occurring during use. For example, it may be desirable to include a color-changing composition in the sheet whereby the absorbent layer changes color when it absorbs fluid. Additionally, colors of respective sheet elements may be selected such that the standoff system and absorbent layer are initially the same color, such as white, until the absorbent layer changes to a contrasting color, such as red. One method of accomplishing such a color change is to incorporate a food grade additive or other pigmented powder, either within or underneath the absorbent layer. When the pigmented powder is exposed to fluid it dissolves in the fluid and "bleeds" into the absorbent layer and changes the apparent color of the absorbent layer. Color change may be triggered by the occurrence of other physical changes in functionality, such as depletion of an anti-microbial agent, or presence of bacteria, within the absorbent layer. One method believed suitable for such an execution is disclosed in U.S. Pat. No. 4,311,479, issued Jan. 19, 1982 to Fenn et al., the disclosure of which is hereby incorporated herein by reference.

The cut-resistant reinforcing system is preferably substantially deformation-resistant under such typical forces such that a separation between the substance or object and the underlying absorbent layer is maintained. Materials utilized to form the reinforcing system may additionally be resilient such that some slight degree of deformation may be encountered in use but that the deformation is temporary in nature and the reinforcing system returns to its substantially undeformed state when the externally-applied forces are removed from the substance or object.

When subjected to impact from a sharp object or cutting implement such as a knife having an elongated, substantially linear edge, the sheet material 10 of FIG. 1 is configured such that the impacting edge will contact at least one, and preferably more than one, element of the reinforcing system to distribute the impact force and ensure that the impacting edge will not contact the comparatively more vulnerable absorbent layer and barrier layer underneath and/or between the elements.

The cut-resistant reinforcing system is preferably formed from a material which is durable in use, resilient, cut-resistant, and/or scuff/abrasion-resistant. Typical materials which are known in the art as exhibiting such properties may be utilized, including those which typically exhibit a high degree of toughness, interlocked molecular structure of comparatively high molecular weight material, and comparatively high coefficient of sliding friction. Suitable materials include polymeric materials, such as EVA, high density polyethylene (HDPE), low density polyethylene (LDPE), linear low density polyethylene (LLDPE), polyvinyl chloride (PVC), plastisols, polypropylene (PP), polyethylene terepthalate (PET), crystallized PET, PBT, PEN, and polyurethanes, densified paper materials, epoxies, thermosets, inorganic fillers or fibers, mineral fibers, etc.

Figure 2:
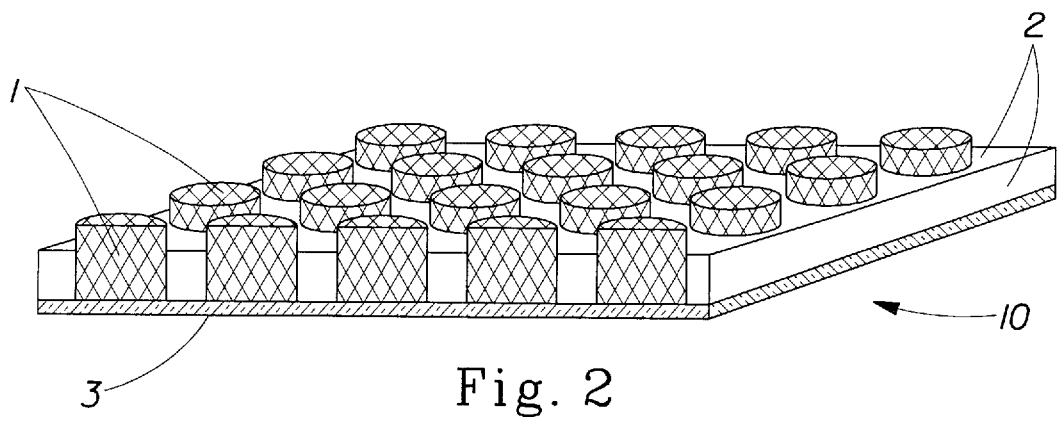
FIG. 2 is a partially-segmented perspective view of another embodiment of a multi-purpose absorbent and cut-resistance sheet material according to the present invention.

FIG. 2 depicts another embodiment of a sheet material 10 in accordance with the present invention. In the embodiment of FIG. 2, the support elements 1 extend upwardly above the upper surface of the absorbent layer 2 to prevent materials placed upon the sheet material from directly contacting the absorbent layer. The embodiment of FIG. 2, like the embodiment of FIG. 1, also depicts the support elements 1 as fully traversing the thickness of the absorbent layer 2 from the backing layer 3 to beyond the outer surface of the absorbent layer 2.

Figure 3:
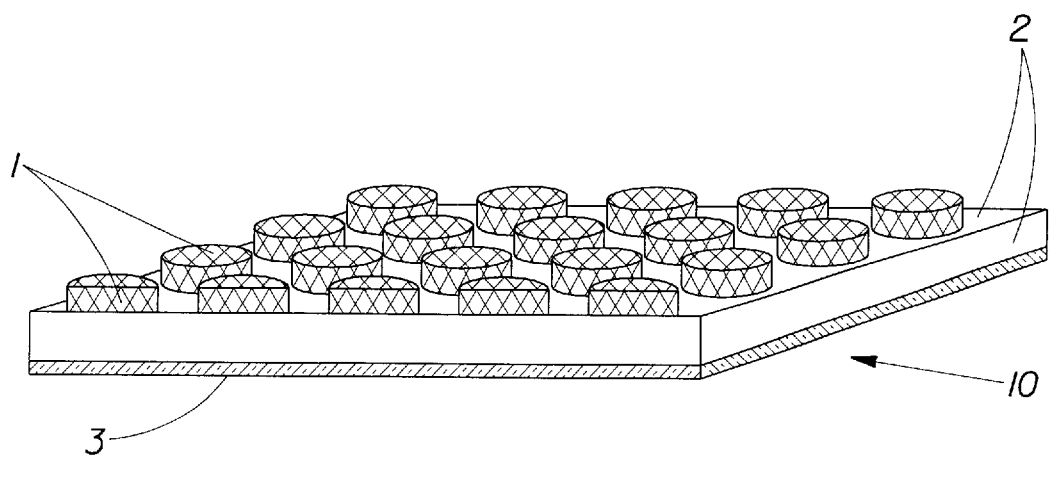
FIG. 3 is a partially-segmented perspective view of another embodiment of a multi-purpose absorbent and cut-resistance sheet material according to the present invention.

FIG. 3 depicts another such embodiment, but in FIG. 3 the support elements 1 extend upwardly from the absorbent layer 2 but do not penetrate the absorbent layer 2, and therefore do not contact the backing layer 3.

Figure 4:
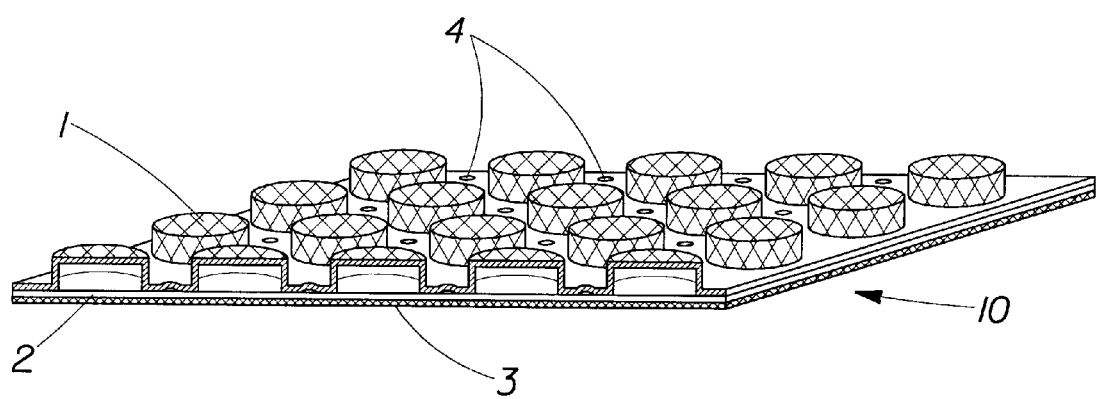
FIG. 4 is a partially-segmented perspective view of another embodiment of a multi-purpose absorbent and cut-resistance sheet material according to the present invention.

While the embodiments of FIGS. 1–3 depict sheet materials 10 wherein the cut-resistant support system comprises a plurality of individual support elements, it is also within the scope of the present invention to provide a cut-resistant support system comprising a continuous web of material. FIG. 4 depicts such an embodiment, wherein the support system comprises a formed film material with a plurality of raised cut-resistant regions 1 surrounded by a valley containing apertures 4 for fluid communication with the absorbent layer 2. As in previous embodiments, a backing layer 3 protects underlying surfaces from contamination. Due to the interior volume contained between the formed film material forming the regions 1 and the backing layer 3, the absorbent layer 2 could be omitted and the interior volume relied upon for fluid retention and storage to form a fluid reservoir.

Figure 5:
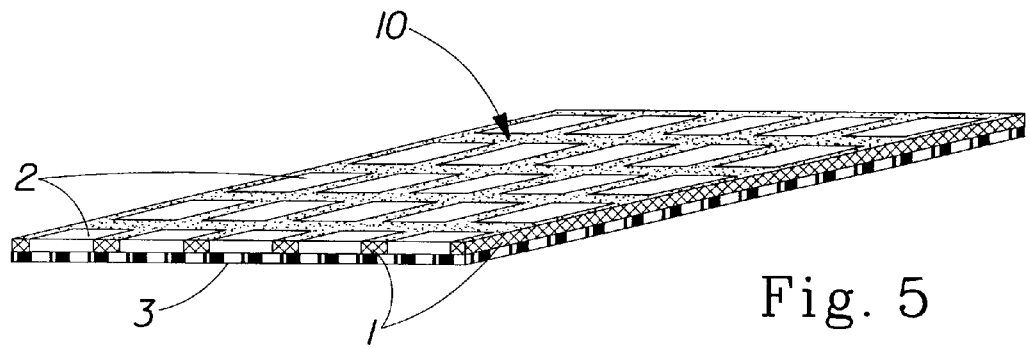
FIG. 5 is a partially-segmented perspective view of another embodiment of a multi-purpose absorbent and cut-resistance sheet material according to the present invention.
Figure 6:
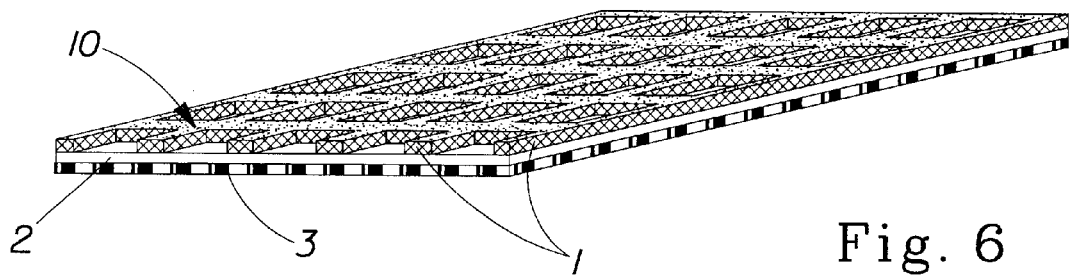
FIG. 6 is a partially-segmented perspective view of another embodiment of a multi-purpose absorbent and cut-resistance sheet material according to the present invention.
Figure 7:
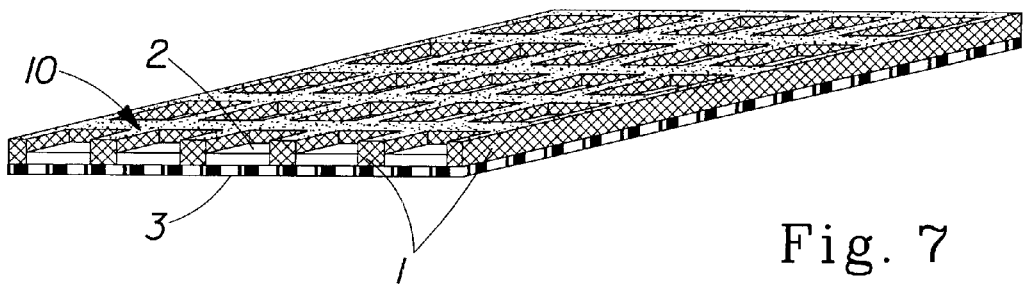
FIG. 7 is a partially-segmented perspective view of another embodiment of a multi-purpose absorbent and cut-resistance sheet material according to the present invention.

FIGS. 5–7 depict additional embodiments of sheet materials in accordance with the present invention, these embodiments have a continuous reinforcing system 1 which forms a network across the working surface of the sheet material. In terms of structural elements, FIGS. 5–7 correlate to the discussion above of FIGS. 1, 3, and 2, respectively.

Although for some applications a compartmentalized absorbent material distribution may be desirable, it is presently preferred for most applications to utilize a continuous absorbent layer so as to provide for the maximum level of absorbency.

Figure 8:
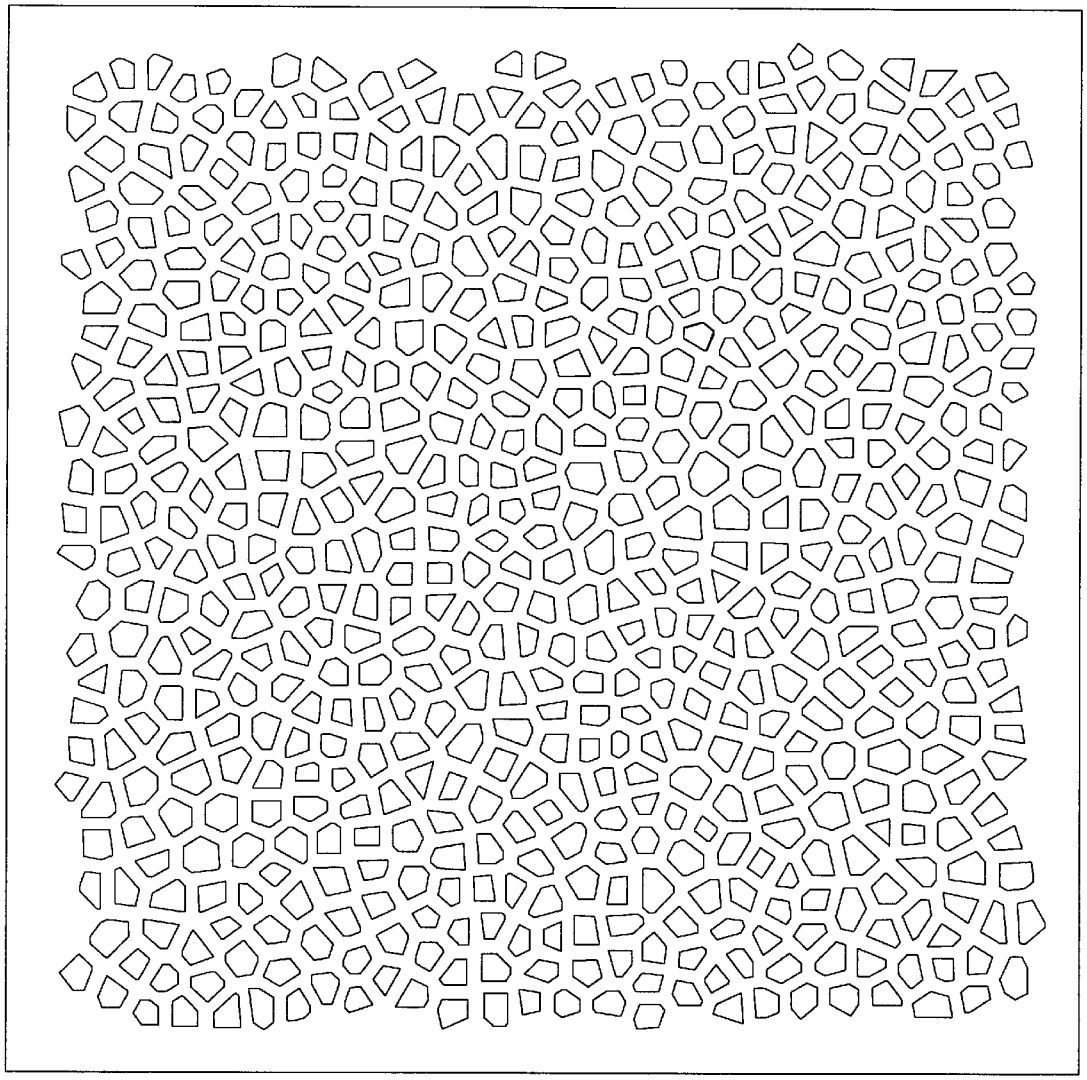
FIG. 8 is a plan view of an amorphous pattern suitable for use in constructing sheet materials according to the present invention.

While FIGS. 1–7 depict an ordered arrangement of standoff elements, an amorphous (non-ordered) pattern such as illustrated in FIG. 8 of reinforcing elements would minimize the likelihood of a blade or edge contacting the absorbent layer while maintaining a flexible structure having individual standoff elements. Such amorphous patterns are described in greater detail in commonly-assigned, co-pending (allowed) U.S. patent application Ser. No. 08/745,339, filed Nov. 8, 1996 now U.S. Pat. No. 5,965,235 in the names of McGuire, Tweddell, and Hamilton, entitled "Three-Dimensional, Nesting-Resistant Sheet Materials and Method and Apparatus for Making Same", the disclosure of which is hereby incorporated herein by reference, and would provide for omnidirectional protection from impacting edges such as knives or sharp objects. Accordingly, the sheet material may be oriented in any desired direction with regard to an impacting edge and yet provide protection for the absorbent layer and barrier layer from direct contact with such an edge.

Sheet materials in accordance with the present invention may be deployed in a wide variety of scenarios and be utilized for a wide variety of functions. Representative products made from such sheet materials and corresponding uses include, but are not limited to, place mats, food preparation mats, mats for draining washed or cooked food, floor mats, drawer and shelf liners, etc. Objects of interest may include food items such as cuts of meat, produce, baked goods, produce such as fruits and vegetables, etc. Substances of interest would include substances having sufficient integrity to bridge the standoff system, such as cookie dough, etc.

In accordance with the present invention, sheet materials such as those depicted in the foregoing discussion of drawing figures exhibit comparatively high levels of both absorbency and cut-resistance, more particularly, absorbency factor and slice resistance.

TEST METHODS

The following test methods have been developed and utilized for characterizing the sheet materials in accordance with the present invention.

Absorbency Rate:

1) A 36 in$^2$ (6 in. by 6 in.) (232.26 cm$^2$) sample is weighed and placed directly under a Buret.
2) 10 cc of distilled water is dispensed from the Buret onto the sample.
3) The water is permitted to absorb for 30 seconds. (If all water is absorbed prior to 30 seconds, record the time of absorption for later calculations.)
4) At 30 seconds, the sample is tapped 10 times on its side, removing any non absorbed water.
5) Weigh the sample and record the weight.
6) Calculate the absorbency rate as (final weight–initial weight)/time. The units are $$\frac{g_{water}}{s}.$$

7) Calculate the unit absorbency rate as ((final weight–initial weight)/time)/sample area. The units are $$\frac{g_{water}}{s \cdot cm^2}.$$

8) Test 3–5 samples per above.
9) Report average of sample values.

Absorbent Capacity:

1) A 16 in$^2$ (4 in. by 4 in.) (103.22 cm$^2$) sample is weighed and placed into a container of distilled water, completely submerged.

2) The sample remains completely submerged for 120 seconds.
3) At 120 seconds, the sample is removed from the water and permitted to drip dry for 30 seconds.
4) At the completion of the 30 second drip dry, the sample is shaken 1 time to remove residual water.
5) Weigh the sample and record the weight.
6) Calculate the capacity as (final weight−initial weight)/sample area. The units are $$\frac{g_{water}}{cm^2}$$

7) Test 3–5 samples per above.
8) Report average of sample values.

Absorbent Efficiency:
1) Calculate the absorbent efficiency as:

$$\text{Efficiency} = \frac{\text{Capacity} \cdot \text{Rate}}{\text{thickness}} * 10^4$$

Slice Testing Apparatus:

The test apparatus described applies a known force in the z (vertical) direction on a knife blade to measure the cut resistance of a sample. A knife blade is placed in the knife holder. The knife blades used for all testing were Poultry Blades Code # 88-0337 by Personna. The test sample is mounted to a sample platform. The knife blade is then brought into contact with the sample. A known load is applied to the knife blade in the vertical direction. The sample platform is then moved at a rate of 8 inches per second for 4 inches under the weight of the knife blade creating a slice. Consecutive slices of increasing load are made until the knife blade cuts through the sample. The knife force required to penetrate completely through the sample is recorded. Slice resistance is calculated as the slice force/sample thickness. Replicate test on 3–5 separate samples and report average values.

Sheet materials in accordance with the present invention exhibit both absorbency and slice resistance in hither-to-fore unattained levels of performance. As illustrated by the accompanying tabulation of data and graphical illustration, the sheet materials of the present invention exhibit an absorbent efficiency of at least about 0.2 and a slice resistance of at least about 30 kgf/cm, more preferably an absorbent efficiency of at least about 1.0 and a slice resistance of at least about 40 kgf/cm.

EXAMPLES

Figure 9:
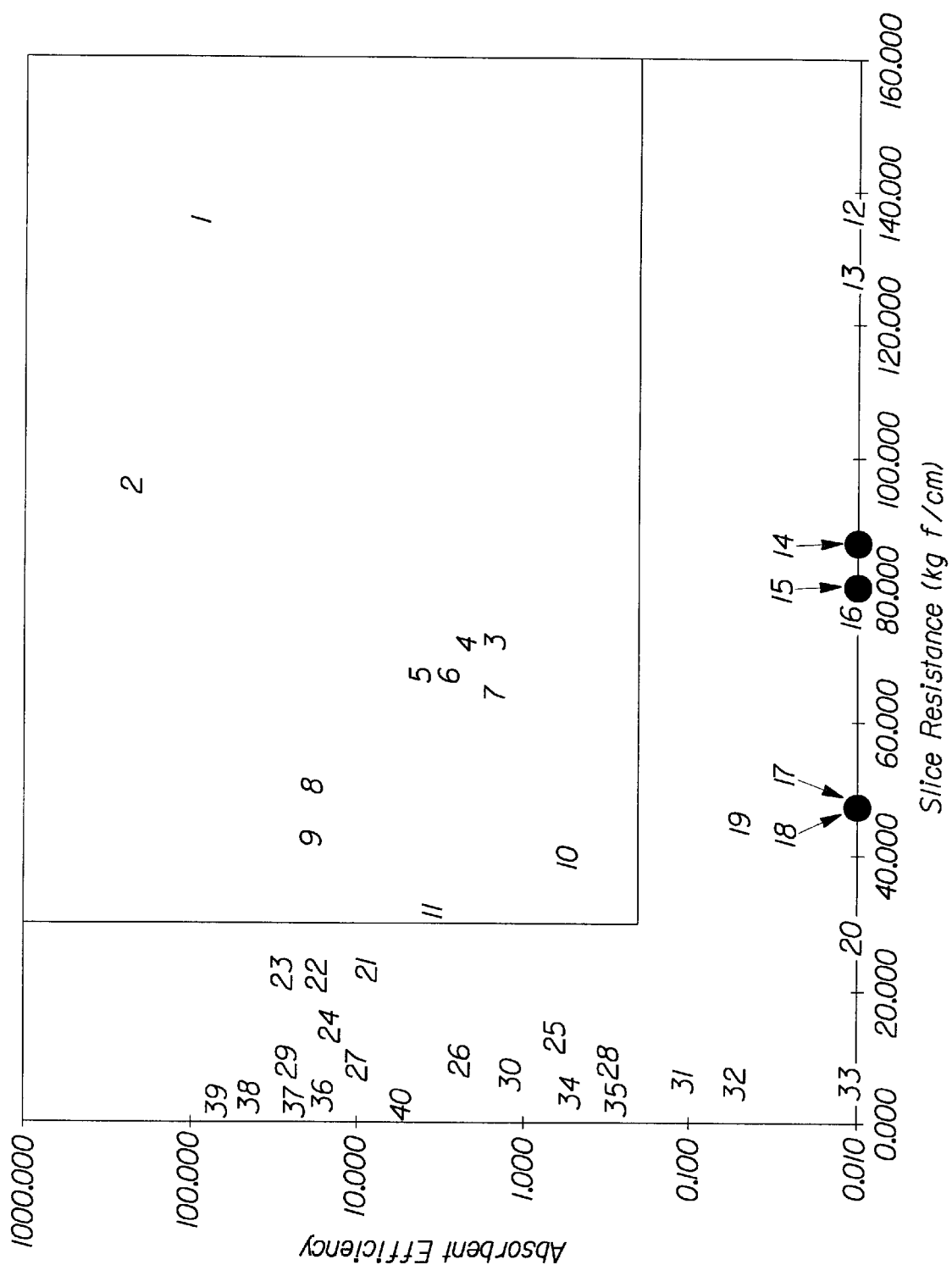
FIG. 9 is a graphical illustration of the tabular data presented in Table 1.

The following numbered Examples describe materials which were made and tested in accordance with the test protocol herein to generate the data tabulated in Table 1 and presented in FIG. 9.

| | | |
|---|---|---|
| 1 | 0.004" Stainless w/Bounty | Holes, 12.7 mm in diameter, were formed in a .1 mm thick piece of stainless steel shim stock. This layer was adhered to a Bounty ® paper towel, manufactured by Procter & Gamble. A 0.075 mm thick layer of metallocene was then adhered to the paper towel as a backsheet. |
| 2 | 0.004" Stainless w/AGM and Bty | Holes, 12.7 mm in diameter, were formed in a .1 mm thick piece of stainless steel shim stock. This layer was adhered to an absorbent layer. The absorbent layer consisted of 5 grams of an absorbent hydrogel material, such as cross-linked polyacrylates, as discussed in U.S. Pat. No. 5,397,626, between a layer of Aquis Super Absorbent Towel manufactured by Britanne Corporation, and a layer of 0.075 mm thick metallocene. The Aquis towel side of the absorbent layer was attached to the stainless steel layer. |
| 3 | BF w/epoxy & backing | Three dimensionally embossed paper substrate. The embossed lands are hexagons arranged in a 60 degree array. The hexagons are approximately 10 mm across and spaced 12 mm on center. The paper is a 50/50 blend of southern hardwood kraft and southern softwood kraft, with 0.5% Kymene 557H added by solids weight. The tops of the embossed lands in structure are coated with an epoxy resin. The coating weight of 100 g/m^2. The resin is Shell 862 with Shell 3234 hardner blended per the manufacturers specifications. A 0.075 mm thick film of metallocene is then adhered to the back. |
| 4 | BF w/epoxy, no backing | Three dimensionally embossed paper substrate. The embossed lands are hexagons arranged in a 60 degree array. The hexagons are approximately 10 mm across and spaced 12 mm on center. The paper is a 50/50 blend of southern hardwood kraft and southern softwood kraft, with 0.5% Kymene 557H added by solids weight. The paper had a dry basis weight of 225 #/3000 sq. ft. The tops of the embossed lands in structure are coated with an epoxy resin. The coating weight of 100 g/m^2. The resin is Shell 862 with Shell 3234 hardner blended per the manufacturers specifications. |
| 5 | MU 165 paper w/epoxy | Paper stock was manufactured using a 50/50 blend of southern hardwood kraft and southern softwood kraft, with 0.5% Kymene 557H added by solids weight. The paper had a dry basis weight of 165 #/3000 sq. ft. The paper was saturated with 70 g/m^2 of epoxy. The epoxy was localized in circular areas, where the center of these areas are spaced 12 mm apart in a hexagonal array. |
| 6 | MU 165 w/epoxy, back, Atmer | Paper stock was manufactured using a 50/50 blend of southern hardwood kraft and southern softwood kraft, with 0.5% Kymene 557H added by solids weight. The paper had a dry basis weight of 165 #/3000 sq. ft. The paper was saturated with 70 g/m^2 of epoxy. The epoxy was localized in circular areas, where the center of these areas are spaced 12 mm apart in a hexagonal array. A 0.075 mm thick film of metallocene was then adhered to the back. The structure was then sprayed with a 5% solution of Atmer ® 100, manufactured by ICI Surfactants. |
| 7 | MU 165 w/epoxy & backing | Paper stock was manufactured using a 50/50 blend of southern hardwood kraft and southern softwood kraft, with 0.5% Kymene 557H added by solids weight. The paper had a dry basis weight of 165 #/3000 sq. ft. The paper was saturated with 70 g/m^2 of epoxy. The epoxy was localized in circular areas, where the center of these areas are spaced 12 mm apart in a hexagonal array. A 0.075 mm thick film of metallocene was then adhered to the back. |
| 8 | PET (.020) random xtalized | A .5 mm thick sheet of PET was formed into a three dimensional amorphous pattern (McGuire et al. patent application). The PET in the raised areas was crystallized. Holes were formed in the valleys between the raised areas. This layer was adhered to a |

| | | |
|---|---|---|
| 9 | PET (.020) random pattern | Bounty ® paper towel, manufactured by Procter & Gamble. A 0.075 mm thick layer of metallocene was then adhered to the paper towel as a backsheet. The edges of the structure were then sealed. A .5 mm thick sheet of PET was formed into a three dimensional amorphous pattern (McGuire et al. patent application). Holes were formed in the valleys between the raised areas. This layer was adhered to a Bounty ® paper towel, manufactured by Procter & Gamble. A 0.075 mm thick layer of metallocene was then adhered to the paper towel as a backsheet. The edges of the structure were then sealed. |
| 10 | MU 100 w/epoxy & backing | Paper stock was manufactured using a 50/50 blend of southern hardwood kraft and southern softwood kraft, with 0.5% Kymene 557H added by solids weight. The paper had a dry basis weight of 100 #/3000 sq. ft. The paper was saturated with 40 g/m^2 of epoxy. The epoxy was laid down in a discontinuous bow-tie pattern. A 0.075 mm thick film of metallocene was then adhered to the back. |
| 11 | Chop N Chop ® w/Bounty | Chop N Chop ® is an approximately 0.55 mm thick polypropylene copolymer food preparation mat manufactured by New Age Products, Patent #5472790. Holes, 1.6 mm diameter spaced 6.35 mm on center, were formed in a Chop N Chop. This layer was adhered to a Bounty ® paper towel, manufactured by Procter & Gamble. A 0.075 mm thick layer of metallocene was then adhered to the paper towel as a backsheet. |
| 12 | MU 165 Fully Sat. w/Shell 862 | Paper stock was manufactured using a 50/50 blend of southern hardwood kraft and southern softwood kraft, with 0.5% Kymene 557H added by solids weight. The paper had a dry basis weight of 165 #/3000 sq. ft. The paper was saturated with 135 gm/m^2 of epoxy. The resin is Shell 862 with Shell 3234 hardner. A 0.075 mm thick film of metallocene was adhered to the back of the structure. |
| 13 | CPET | 0.36 mm thick sheet of crystallized CPET. |
| 14 | E Cast F28 Epoxy | E-Cast F-28 resin and F-14 hardner, both manufactured by United Resin Corporation, were combined per the manufacturers specifications and cast into a 1 mm thick sheet. |
| 15 | PE Cutting Board | "Kitchen Saver" polyethylene cutting board, approximately 1.1 cm thick, manufactured by Foley Martens. |
| 16 | Chop N Chop ® | An approximately 0.55 mm thick polypropylene copolymer food preparation mat manufactured by New Age Products, Patent #5472790. |
| 17 | Dixie ® 5-Layer Paper Plate | Heavy duty 5 layer paper plate manufactured by Dixie; UPC # 42000 71340. |
| 18 | Cut & Toss ® | Food preparation mat made from solid bleached sulfate cartonboard with a PET covering, manufactured by The Fonda Group. |
| 19 | Chinet ® Paper Plate | Paper dinner plate manufactured by Chinet; UPC # 37700 32226. |
| 20 | Wood Cutting Board | Hardwood cutting board, UPC # 72075 00017, approximately 2 cm thick manufactured by Foley Martens. |
| 21 | MU 165 paper w/Kymene | Paper stock was manufactured using a 50/50 blend of southern hardwood kraft and southern softwood kraft, with 0.5% Kymene 557H added by solids weight. The paper had a dry basis weight of 165 #/3000 sq. ft. |
| 22 | BF Paper w/Kymene | Three dimensionally embossed paper substrate. The embossed lands are hexagons arranged in a 60 degree array. The hexagons are approximately 10 mm across and spaced 12 mm on center. The paper is a 50/50 blend of southern hardwood kraft and southern softwood kraft, with 0.5% Kymene 557H added by solids weight. |
| 23 | BF Paper Plain | Three dimensionally embossed paper substrate. The embossed lands are hexagons arranged in a 60 degree array. The hexagons are approximately 10 mm across and spaced 12 mm on center. The paper is a 50/50 blend of southern hardwood kraft and southern softwood kraft. |
| 24 | Burbur Carpet | Burbur carpet with a thickness of approximately 7.9 mm |
| 25 | Cut Resist. Glove (Heavy) | Golden Needles cut resistant glove model # 70-320 manufactured by Ansell. |
| 26 | Leather Chamois | Tanners Select Leather Chamois, approximately 1 mm thick, manufactured by U.S. Chamois Model #TS65T. |
| 27 | Screen w/Bounty ® & Metallocene | Aluminum windows screen, with an absorbent layer of Bounty Paper Towel, manufactured by Procter & Gamble, and a backing layer of 0.075 mm metallocene film. |
| 28 | Cut Resist. Glove (Light) | Golden Needles cut resistant glove model # 70-300 manufactured by Ansell. |
| 29 | Door Mat | 100% polyester floor mat, approximately 2.7 mm thick, manufactured by Glenoit Corp; style # 8260. |
| 30 | Cut Resist. Glove (Med) | Golden Needles cut resistant glove model # 70-310 manufactured b Ansell. |
| 31 | Corrugated (C flute) | Single wall C flute corrugated with a Mullen burst test specification of 200 lbs/sq. in. |
| 32 | Reemay ® Polyester Non-woven | Reemay ® polyester non-woven, style no. 2033, 0.43 mm thick. |
| 33 | Styrofoam Plates | Styrofoam plate manufactured by Tenneco Packaging UPC # 13700 63350. |
| 34 | Scouring Pad | Synthetic scrubbing pad manufactured by Quickie Manufacturing, Model # 509 |
| 35 | 0.015 Non-woven w/Bnty & Met | A layer of Reemay ® polyester style no. 2033 was adhered to a Bounty ® paper towel, manufactured by Procter & Gamble. A 0.075 mm thick layer of metallocene is adhered to the paper towel as a backsheet. |
| 36 | Dish Towel | 100% cotton towel, approximately 1.1 mm thick, manufactured by Leshner Corporation; UPC # 75574 06360. |
| 37 | PVA Mat | The Absorber PVA absorbent mat, approximately 1.4 mm thick, manufactured by Emgee/Clean Tools, Inc.; UPC # 85685 00149. |
| 38 | Spill Mat | Universal Ham-O Pigmat Spill Mat, item # MAT267, manufactured by New Pig Products. |
| 39 | Bounty ® Paper Towel | Quilted paper towel manufactured by Procter & Gamble Co. |
| 40 | 0.008 Non-woven w/Bnty & Met | A layer of Reemay ® polyester style no. 2011is adhered to a Bounty ® paper towel, manufactured by Procter & Gamble. A 0.075 mm thick layer of metallocene is adhered to the paper towel as a backsheet. |

TABLE 1

| Sample No. | Basis Wt (g/cm^2) | Thickness (cm) | Capacity (g/cm^2) | Abs. Rate (g/s) | Unit Abs. Rate (g/s/cm^2) | Abs. Eff. | Avg. Slice (kgf) | Slice (kgf/cm) |
|---|---|---|---|---|---|---|---|---|
| 1 | 0.120 | 0.102 | 0.138 | 1.469 | 6.323E-03 | 86.078 | 13.771 | 135.545 |
| 2 | 0.153 | 0.145 | 2.945 | 0.257 | 1.108E-03 | 225.365 | 13.771 | 95.119 |
| 3 | 0.053 | 0.099 | 0.037 | 0.093 | 3.995E-04 | 1.496 | 7.128 | 71.954 |
| 4 | 0.047 | 0.089 | 0.038 | 0.106 | 4.552E-04 | 1.957 | 6.356 | 71.496 |
| 5 | 0.036 | 0.061 | 0.049 | 0.103 | 4.435E-04 | 3.567 | 4.086 | 67.028 |
| 6 | 0.046 | 0.069 | 0.037 | 0.125 | 5.394E-04 | 2.922 | 4.585 | 66.862 |
| 7 | 0.045 | 0.069 | 0.041 | 0.057 | 2.467E-04 | 1.465 | 4.427 | 64.545 |
| 8 | 0.077 | 0.177 | 0.084 | 0.570 | 2.454E-03 | 17.594 | 5.766 | 49.348 |
| 9 | 0.077 | 0.117 | 0.084 | 0.570 | 2.454E-03 | 17.594 | 4.949 | 42.354 |
| 10 | 0.030 | 0.042 | 0.016 | 0.030 | 1.290E-04 | 0.503 | 1.648 | 39.269 |
| 11 | 0.072 | 0.132 | 0.068 | 0.143 | 6.158-E04 | 3.172 | 4.162 | 31.509 |
| 12 | 0.066 | 0.066 | 0.001 | 0.005 | 2.214E-05 | 0.004 | 9.080 | 137.492 |
| 13 | 0.076 | 0.036 | 0.001 | 0.001 | 5.575E-06 | 0.001 | 4.540 | 127.672 |
| 14 | 0.036 | 0.109 | 0.001 | 0.001 | 3.202E-06 | 0.000 | 9.080 | 83.135 |
| 15 | 1.267 | 1.087 | 0.039 | 0.001 | 5.735E-06 | 0.002 | 87.440 | 80.433 |
| 16 | 0.049 | 0.057 | 0.001 | 0.004 | 1.628E-05 | 0.003 | 4.404 | 77.057 |
| 17 | 0.036 | 0.051 | 0.011 | 0.000 | 1.992E-06 | 0.004 | 2.406 | 47.366 |
| 18 | 0.039 | 0.051 | 0.001 | 0.001 | 3.505E-06 | 0.001 | 2.361 | 46.472 |
| 19 | 0.041 | 0.066 | 0.011 | 0.005 | 2.311E-05 | 0.039 | 2.906 | 43.998 |
| 20 | 0.991 | 1.923 | 0.008 | 0.012 | 5.195E-05 | 0.002 | 52.635 | 27.375 |
| 21 | 0.028 | 0.061 | 0.061 | 0.182 | 7.823E-04 | 7.874 | 1.407 | 23.087 |
| 22 | 0.033 | 0.076 | 0.083 | 0.350 | 1.507E-03 | 16.464 | 1.634 | 21.449 |
| 23 | 0.034 | 0.081 | 0.113 | 0.402 | 1.731E-03 | 24.134 | 1.680 | 20.667 |
| 24 | 0.192 | 0.787 | 0.233 | 1.052 | 4.530E-03 | 13.399 | 10.941 | 13.896 |
| 25 | 0.124 | 0.381 | 0.137 | 0.037 | 1.5933-04 | 0.573 | 4.616 | 12.115 |
| 26 | 0.023 | 0.099 | 0.122 | 0.041 | 1.779E-04 | 2.189 | 0.851 | 8.593 |
| 27 | 0.036 | 0.109 | 0.053 | 0.453 | 1.951E-03 | 9.527 | 0.908 | 8.313 |
| 28 | 0.095 | 0.241 | 0.065 | 0.024 | 1.034E-04 | 0.277 | 1.972 | 8.172 |
| 29 | 0.112 | 0.267 | 0.146 | 0.954 | 4.109E-03 | 22.477 | 2.119 | 7.944 |
| 30 | 1.104 | 0.330 | 0.114 | 0.074 | 3.196E-04 | 1.104 | 2.497 | 7.562 |
| 31 | 0.058 | 0.381 | 0.068 | 0.013 | 5.398E-05 | 0.096 | 2.406 | 6.315 |
| 32 | 0.011 | 0.043 | 0.009 | 0.006 | 2.551E-05 | 0.055 | 0.258 | 5.972 |
| 33 | 0.012 | 0.094 | 0.001 | 0.000 | 2.870E-07 | 0.000 | 0.508 | 5.411 |
| 34 | 0.065 | 0.859 | 0.088 | 0.106 | 4.583E-04 | 0.468 | 3.814 | 4.442 |
| 35 | 0.023 | 0.109 | 0.066 | 0.010 | 4.211E-05 | 0.255 | 0.378 | 3.464 |
| 36 | 0.020 | 0.114 | 0.075 | 0.582 | 2.506E-03 | 16.339 | 0.348 | 3.045 |
| 37 | 0.023 | 0.140 | 0.158 | 0.427 | 1.838E-03 | 20.827 | 0.363 | 2.600 |
| 38 | 0.043 | 0.305 | 0.266 | 1.152 | 4.959E-03 | 43.218 | 0.681 | 2.234 |
| 39 | 0.004 | 0.030 | 0.054 | 0.808 | 3.480E-03 | 61.901 | 0.062 | 2.048 |
| 40 | 0.017 | 0.099 | 0.080 | 0.146 | 6.301E-04 | 5.096 | 0.151 | 1.528 |

Examples 1–11 are resistant to shredding, and therefore fragments are less easily freed from these materials during cutting operations, and less likely to contaminate food items being prepared. In particular, the cut resistant surfaces (i.e., cutting surfaces) of examples 1–11 have a wet abrasion loss (according to the test described below) of less than about 400 mg per 100 revolutions, and a dry abrasion loss (according to the test described below) of less than about 300 mg per 100 revolutions.

Figure 10:
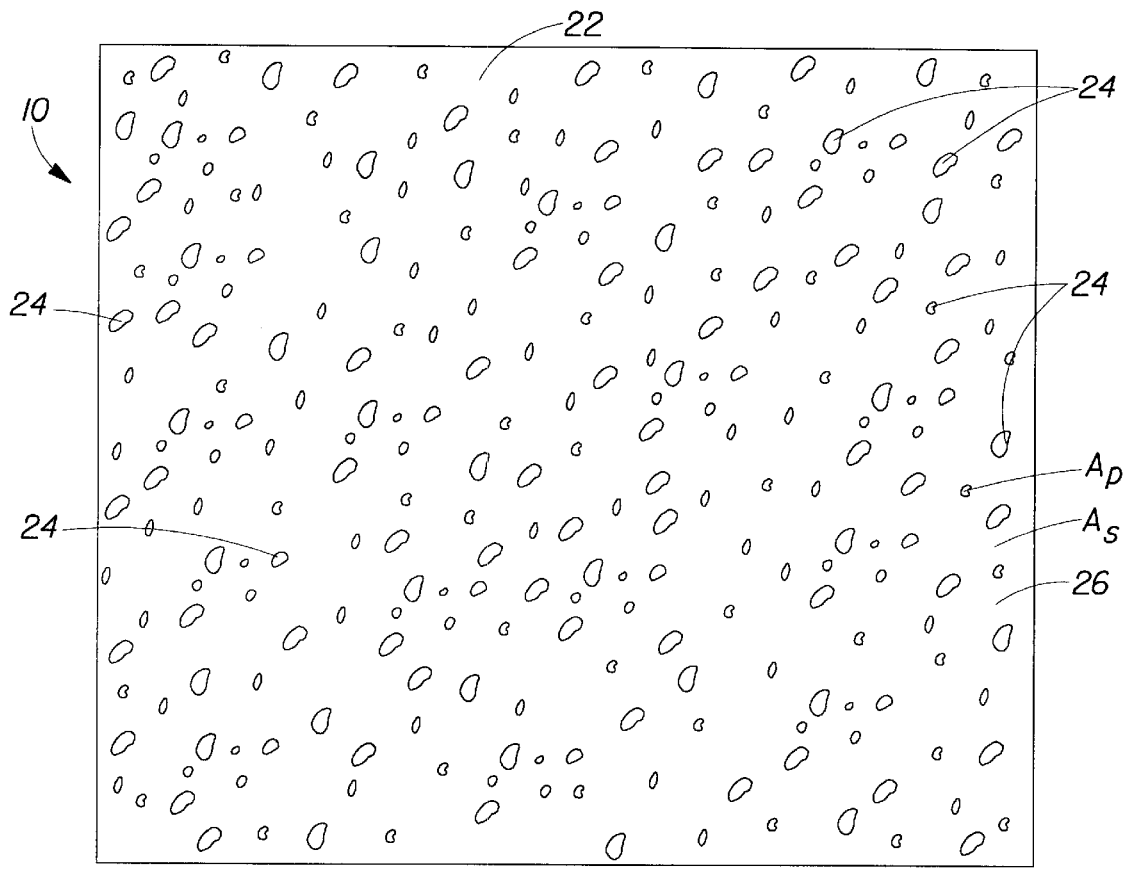
FIG. 10 is a plan view of an exemplary sheet of material, made according to principles of the present invention.
Figure 11:
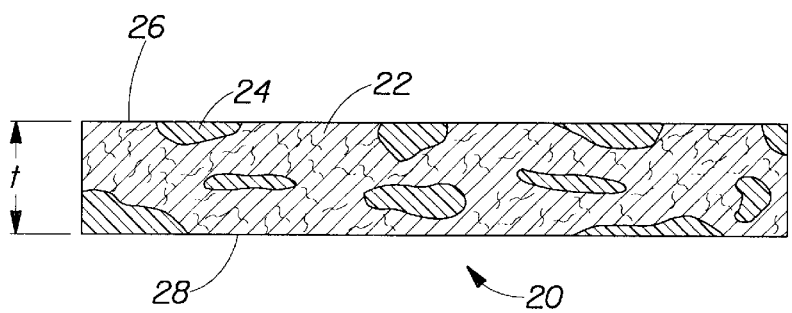
FIG. 11 is a cross-sectional view of the exemplary sheet material of FIG. 10.

FIG. 10 is a plan view of an exemplary sheet material 20 made according to principles of the present invention. In this embodiment, the sheet material 20 includes an absorbent substrate 22 and a plurality of cut-resistant particles 24 randomly dispersed throughout the substrate 22. As best shown in the cross-sectional view of FIG. 11, the sheet 20 is of a substantially uniform thickness t, and includes a cutting surface 26 and a second surface 28. Preferably, the surfaces 26 and 28 are substantially planar.

The continuous absorbent substrate 22 may be formed from any material or materials suitable for absorbing and/or containing fluids of interest. For example, suitable materials include materials formed from natural fibers, such as cellulosic fibers or refined cellulosic fibers, and/or synthetic fibers, including hollow fibers and capillary channel fibers.

As an alternative to or in combination with such fibers, the absorbent substrate 22 could include an absorbent polymeric foam material, an absorbent polymeric gelling material, a hydrogel material, and/or natural starches and gums, for example. Materials of particular interest include cellulosic substrates, such as paperboard, such as are typically used in paper manufacturing. As described in further detail below, SSK (Southern Softwood Kraft), NSK (Northern Softwood Kraft), or eucalyptus cellulosic fiber fluff could be used to form the substrate 22. The substrate 22 could alternatively comprise a non-woven substrate, such as can be constructed by entangling synthetic fibers for instance.

In the embodiment of FIG. 10, the absorbent substrate 22 comprises a continuous layer of material. However, the substrate 22 could comprise a laminate structure having a plurality of layers of the same or differing composition. Moreover, the absorbent substrate 22 may comprise an absorbent or non-absorbent carrier web that may include an absorbent material.

The cut-resistant particles 24 may be formed from any durable material or materials which are substantially resistant to cutting, abrasions, and shredding from cutting utensils used for food preparation, such as kitchen knives for instance. Typical materials which exhibit such properties may be utilized, including those which exhibit a high degree of toughness and a crystalline molecular structure. In the preferred embodiment, the cut-resistant particles 24 are made from polymeric materials, such as ethylene vinyl acetate (EVA), high density polyethylene (HDPE), low density polyethylene (LDPE), linear low density polyethylene (LLDPE), polyvinyl chloride (PVC), plastisols, polypropylene (PP), polyethylene teraphthalate glycol modified (PETG), ultra high molecular weight polyethylene (UHMWPE), polystyrene, and/or polyurethanes. Other thermoplastics, thermosets, polyolefins, polymeric and/or glass composite materials can also be used. Furthermore, the particles 24 may include melamine formaldehyde polymers or polymeric materials compounded with fillers and/or additives, such as talc, mica, calcium carbonate, and/or other inorganic fillers.

Preferably, the material utilized for the cut-resistant particles 24 has a low enough melting temperature $T_m$ such that it will soften at temperatures which will not cause the substrate 22 to char or bum during the application of heat. Such a material can thereby be partially bonded to the substrate 22 through the application of heat and/or pressure, preferably during a subsequent process which densites the sheet material produced during an initial sheet making process. Such a process can also increase the cut resistance and shred resistance of the sheet material. It is preferred that the melting temperature of the particles be less than or equal to about 450 F. Preferably, the material used for the particles 24 has a Vicat softening point (using ASTM test D1525) of less than about 185 F., to allow it to more readily lock or bond to the substrate 22 under relatively low or moderate temperature. One preferred material for use in the particles 24 is the polymer "PETG", such as, for example, is sold under the tradename EASTAR PETG COPOLYESTER 6763 by EASTMAN CHEMICAL CO, and which has a Vicat softening point of around 185 F. Such a material has a good cut and shred resistance and also has a relatively moderate softening point to allow it to be more readily locked into the substrate 22 through heat and/or pressure, without charring or burning the substrate. Moreover, PETG is less hydrophobic than many other thermoplastics, and so the sheet 20 thereby maintains good overall absorbency. Another preferred material for use in the particles 24 is polystyrene.

As noted above, the particles 24 could also comprise compounded polymeric materials. For example, tough inorganic fillers can also be provided in combination with one or more polymers to form the particles 24, in order to reduce the cost of the particles 24 and/or change particle toughness, density, cut-resistance, color, or other property. Suitable fillers include $CaCO_3$, talc, and mica, for example. However, although particulates and fillers can be used to form particles 24, it is preferred that absorbent substrate 22 is substantially free of inorganic free filler particulate. As used herein, the term "free filler particulate" refers to inorganic particles which are not bonded to the absorbent substrate 22 and which merely reside freely within the absorbent substrate. Such a material may be released from the sheet 20 during cutting operations and be mixed with the food items being prepared, potentially making the food undesirable in appearance and/or unsuitable for consumption. It is also preferable that the absorbent substrate 22 is substantially free of organic free filler particulate which is not suitable for contact with food items. Organic free filler particulate does not refer to the absorbent substrate material, such as cellulosic fibers and the like as described herein. By "substantially free" what is meant is an amount no greater than that which would be safe for use of the absorbent substrate in food preparation, or less than an amount in which the filler particulate released during food preparation is noticeable by visual or tactile inspection of the absorbent substrate or food items, or both. By tactile inspection, what is meant is tactile sensory via the hand, or, with respect to food items, the mouth. Preferably, 0% of such free filler particulate is added to the substrate. If free filler particulate is included, however, the level should preferably be no greater than about 10%, more preferably no greater than about 5%, more preferably no greater than about 2%, more preferably no greater than about 1%, more preferably no greater than about 0.5%, and most preferably no greater than about 0.1% by weight of the dry sheet. Notwithstanding the above, the sheet hereof can be substantially free of free filler particulate if it contains unbonded particulate material, but none of the particulate material is releasable when the absorbent sheet is used as intended (i.e., by placing a food item on the side of the sheet intended to be used for cutting, and cutting the food item while it is on this side of the sheet.) Thus, the sheet can be substantially free of filler particulate when it includes unbonded particulate material which is positioned or configured such that little or none is released from the cutting surface during cutting. In particular, it is preferred that at least the cutting surface of the sheet material is shred resistant and exhibits a wet abrasion loss (according to the test described below) of less than about 400 mg per 100 revolutions, and more preferably less than about 300 mg per 100 revolutions. In addition, it is also preferred that the cutting surface of the sheet material exhibits a dry abrasion loss (according to the test described below) of less than about 300 mg per 100 revolutions, and more preferably less than about 200 mg per 100 revolutions.

Because of the absorbent material or materials used in the substrate 22, the sheet material 20 can absorb and sequester fluids deposited on the surfaces 26 and 28. Moreover, because relatively large polymer particles 24 are preferably used, rather than smaller polymer fibers which can coat the materials of the substrate 22 during formation of the final sheet, much of the absorbency of the substrate 22 is maintained. In other words, the polymer particles 24 do not completely cover or surround materials of the substrate 22, and therefore do not significantly mask their absorbent properties. Accordingly, more polymer 24 can be provided in the sheet 20 without significantly impacting the absorbency of the sheet. In contrast, the same amount of small polymer fiber has been found to completely disperse through the structure and surround the material of the substrate 20 and lock out much of its absorbency.

In this regard, it is preferred that the polymeric particles 24 are provided in amounts of up to about 50 percent by weight of the sheet 20. More preferably, the particles 24 are provided in amounts of between about 10 percent and about 40 percent by weight, and most preferably in an amount of around 30 percent by weight. It is also preferred that the absorbent material within the sheet 20 is provided in amounts of at least 50 percent by weight, in order to provide good absorbency. The particles 24 are preferably non-fibrous and the average size of the particles used is preferably at least about 100 micrometers. It should be noted that while some particles may have sizes below 100 micrometers, the average size of all the particles used is preferably at least about 100 micrometers. More preferably the average size of the particles is between about 100 and 1000 micrometers, and most preferably between 200 micrometers and 500 micrometers.

Furthermore, the polymer particles 24 are preferably randomly and widely distributed throughout the sheet 20 to provide good cut-resistance and shred-resistance to the sheet. Such a dispersion provides a high probability that a cutting utensil contacting one of the surfaces 26 or 28 will make contact with one or more of the tough particles 24, thereby reducing the risk that the absorbent substrate 22 will cut or shred in response to the force of the cutting utensil. Particles 24 beneath the cutting surface 26 or 28 can also help minimize cutting and/or shredding of the absorbent substrate 22. The polymer particles 24 are preferably located in fairly discrete areas of the structure, to thereby allow for large areas of the absorbent substrate 20 to be exposed on surfaces 26 and 28 to absorb fluid.

The sheet material 20 preferably has a relatively high basis weight. For example, basis weights of at least 100 pounds per 3000 ft$^2$ are preferred to provide adequate cut-resistance and absorbency. More preferably, the basis weight of the sheet material 20 is at least 165 pounds per 3000 ft$^2$, and most preferably the basis weight of the sheet material is at least 300 pounds per 3000 ft$^2$. Also, the sheet material 20 preferably has a thickness t of between about 250 microns (0.01 inch) and about 1270 microns (0.05 inch) to provide adequate cut-resistance and absorbency. If paper making processes and machinery are used to produce the sheet 20, manufacturing parameters such as material application rate, wire rate, amount and duration of pressure applied, etc. can be adjusted to manipulate the basis weight and thickness of the resulting sheet 20.

Figure 12:
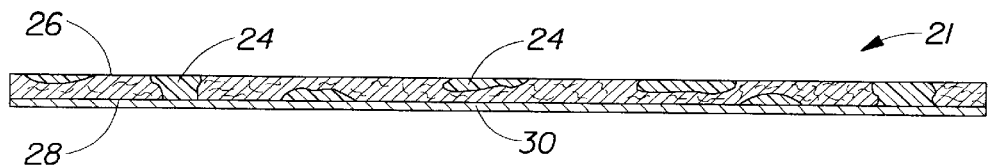
FIG. 12 is a cross-sectional view of an embodiment of a layered sheet material, made according to principles of the present invention.

The densified sheet material 20 can be combined with one or more similar or differing layers, to produce a layered structure 21 having advantages of the various layers. For instance, as shown in the embodiment of FIG. 12, the sheet material 20 can be attached to a backing layer 30 to create a multi-layer sheet 21. The backing layer 30 may be formed from any material or materials suitable for attaching as a layer or coating to the sheet 20. Suitable materials include polymeric films, thermoplastic resins, clay coatings, paperboards or metallic foils. The backing layer 30 can comprise one integral layer of material, or a laminate structure having multiple layers of the same or differing composition. The backing layer 30 may also have a high coefficient of friction so as to provide skid resistance, or a non-skid surface, to the sheet structure 21. To provide skid resistance, the backing layer 30 preferably has a static coefficient of friction of at least about 0.4, and more preferably a coefficient of friction of at least 1 with respect to the support surface (e.g., countertop) to provide a corresponding slip angle of around 45 degrees. In addition, the backing layer 30 is preferably fluid impervious to resist the escape of fluid from the sheet 20, thereby avoiding contamination of the countertop during use.

The layer 30 can be bonded or laminated to the sheet material 20, extruded or thermo-formed onto the sheet 20, or printed, sprayed, adhered, coated, hot-pressed, or otherwise applied to the sheet 20. For instance, for applying a layer, such as the backing layer 30, to the cut-resistant and absorbent sheet 20, a hot band press system can be utilized. In addition to being useful for applying the extra layer 30 to the sheet 20, such a hot band press system can also be used for densification of the sheet 20 to increase its cut-resistance and shred-resistance, and/or to cause the polymer particles in the sheet 20 to bond to and/or partially lock around the absorbent material of the sheet.

Figure 16:
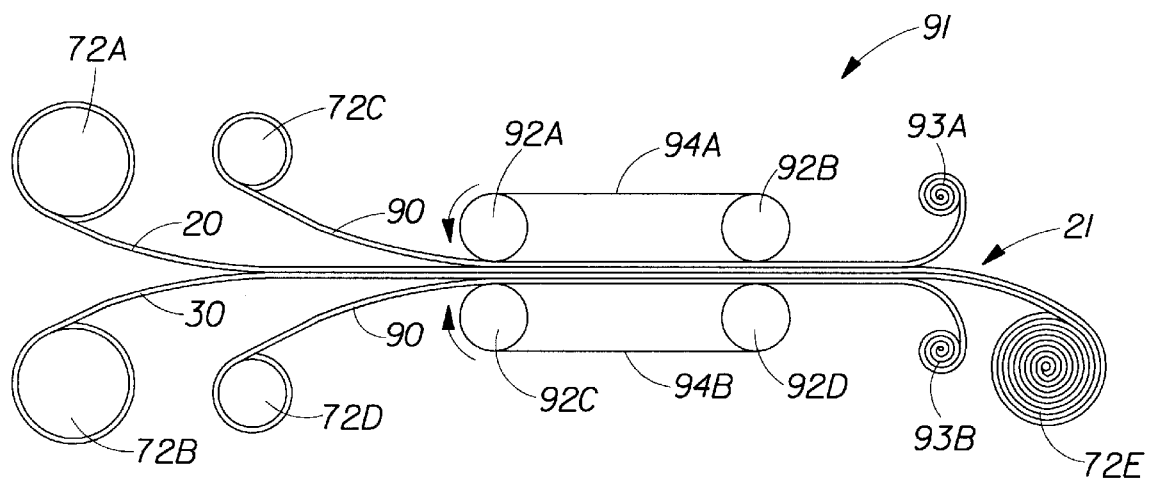
FIG. 16 is a schematic diagram illustrating exemplary equipment and a process that can be used to densify sheet material, such as the sheet materials of FIGS. 10–12, and 14.

An example of an embodiment of a hot band press system 91 is illustrated in FIG. 16. As shown in this figure, an undensified sheet 20 may be fed from a spool or roll 72A, and the backing layer 30 can be fed from a spool 72B. Release paper 90 can be fed from spools 72C and 72D to cover the outward facing surfaces of the sheet 20 and the layer 30, to prevent the sheet and layer from sticking to the hot press 91. The four layers (90, 20, 30 and 90) are fed together through the hot press 91 to bond or laminate sheet 20 with backing layer 30, and also to densify the sheet 20, locking the polymer particles into the sheet. The hot press 91 includes a pair of heated rollers 92A and 92B which move a steel belt 94A and transfer heat thereto. Likewise heated rollers 92C and 92D move and heat steel belt 94B. The four layers are heated and pressed between the two belts 94A and 94B and are moved therebetween to form the layered material 21, which can be taken up on a spool 72E. The release papers 90 can be rewound on rewind rollers 93A and 93B.

It should be understood that, while the backing layer 30 is used in the exemplary implementations shown in FIG. 12, it is not necessary to include the backing layer. In particular, the sheet material 20 can be densified alone using the system of FIG. 16, and then used as a densified sheet having no backing layer. Conversely, while other embodiments described herein are shown without a fluid impervious backing layer 30, it should be understood that any of these embodiments could be provided with such a layer to increase skid resistance and/or resist the escape of fluid from the sheet materials 20.

Figure 13:
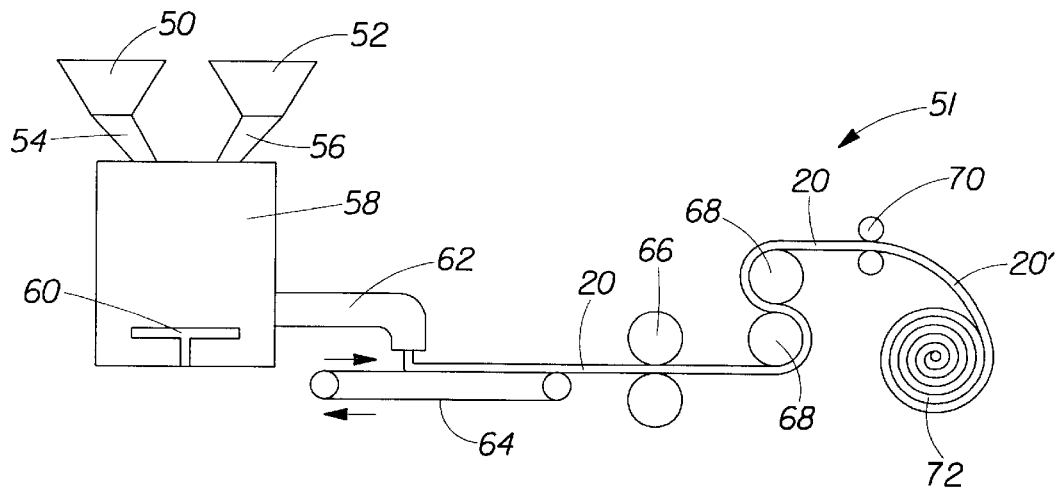
FIG. 13 is a general schematic illustration of a sheet processing system suitable for manufacturing the sheet material of FIG. 10 in accordance with principles of the present invention.

FIG. 13 illustrates exemplary equipment and processes for producing the sheet 20 according to principles of the present invention. In the example of FIG. 13, an undensified sheet material 20 is manufactured using paper making equipment 51, and a densification process is subsequently conducted to better lock the polymer particles into the sheet material and to produce a densified sheet material 20' having increased cut and shred resistance. In particular, in FIG. 13, cellulose fibers in solution are supplied from a chest 50, and polymer particles in solution are supplied from a chest 52. The materials travel through chutes 54 and 56 and into a mixing chamber 58 where the materials are further blended with water to form an aqueous dispersion. The mixing chamber 58 includes an agitator 60 to assist in the blending process.

The slurry is then fed from the mixing chamber and through a headbox 62, from which it is fed onto a wire belt 64 or screen where it forms a wet sheet 20. The polymer particles are large enough to be restrained from falling through the wire belt 64. However, water from the sheet can fall through the wire belt 64 as it begins to dry. Further drying can be achieved by feeding the sheet through press rolls 66 to mechanically remove water in the sheet or through a vacuum to suction water from the sheet. The sheet 20 can be supported on a woolen felt when moved through the press rolls 66. Dryer rolls 68 can then apply heat to the undensified sheet 20 to accomplish further drying by evaporation. In subsequent densification processing, it is preferred that additional heat and/or pressure are applied by the rolls 70, to cause the polymer particles to flow and thereby be further locked into the sheet. For example, rolls 70 could comprise a series of rolls, such as a calendar stack, to lock the particles into the sheet. As previously described with respect to FIG. 16, a heated band press could also be utilized for the densification process. The resulting dried and densified sheet 20' can then be wound on a spool 72.

Figure 14:
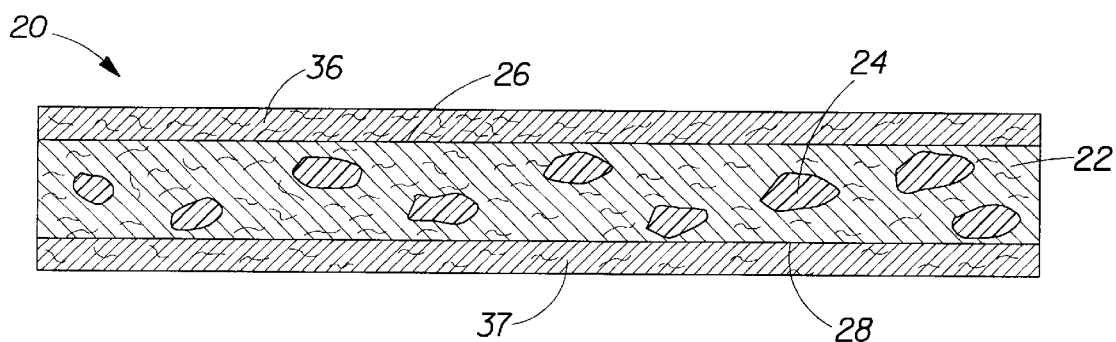
FIG. 14 is a cross-sectional view of another embodiment of a layered sheet material made according to principles of the present invention.

FIG. 14 illustrates another alternative layered sheet 21, made according to principles of the present invention. In this embodiment, the layered sheet 21 comprises a top layer 36, a bottom layer 37, and an absorbent and cut-resistant sheet material 20. As described above, the sheet material 20 includes an absorbent substrate 22 and cut-resistant polymeric particles 24. The substrate 22 and particles 24 can be made from one or more of the exemplary materials described above. For example, the substrate 22 preferably comprises cellulosic material and the particles 24 preferably comprise polymeric material. Also, as noted above, the particles have an average size of at least about 100 micrometers, and the absorbent substrate 22 is substantially free of any inorganic filler and provided in an amount of at least 50 percent by weight of the sheet 20. The basis weight of the sheet 20 is preferably at least 100 pounds per 3000 ft$^2$, and most preferably around 250 pounds per 3000 ft$^2$.

The top layer 36 and bottom layer 37 are preferably free of polymeric particles, and can be made of any material capable of substantially covering the surfaces 26 and 28 of the sheet 20, to thereby restrain particles 24 from becoming freed from the sheet 20 during manufacture. For example, the top layer 36 and bottom layer 37 can be made from paper, paper-board, paper-like materials, or non-woven materials. It has been found that when particles 24 become detached or freed during manufacture of a sheet 20, they may stick to or melt on various parts of the manufacturing equipment. Accordingly, it is desirable to provide one or more components which assist in retaining the particles 24. The layered structure 21 of FIG. 14 is one preferred configuration for retaining the particles 24 within the sheet 20. Other methods and/or components could be utilized in addition to or as alternatives to use of the layers 36 and 37. For example, in addition to or as an alternative to providing layers 36 and 37, a retention agent or aid could be included within the sheet 20 to further assist in locking the particles 24 within the sheet 20. In addition to serving a retention function during manufacture of the sheet 20, the layers 36 and 37 could enhance other properties of the sheet, such as appearance and performance properties for example, after the sheet is manufactured.

The layers 36 and 37 can be bonded or laminated to the sheet material 20, extruded or thermo-formed onto the sheet 20, or printed, sprayed, adhered, coated, pressed, or otherwise applied to the sheet 20. Moreover, the layers 36 and 37 can each comprise one integral layer of material, or a laminate structure having multiple layers of the same or differing composition.

Figure 15:
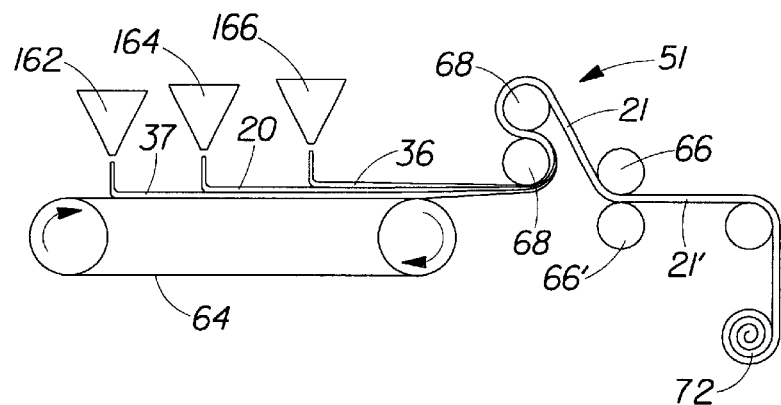
FIG. 15 is a schematic diagram illustrating a process and related equipment that can be used for manufacturing the layered sheet material of FIG. 14.

FIG. 15 illustrates a potential method for manufacturing the layered structure 21 of FIG. 14 using conventional paper manufacturing equipment 51, such as equipment which manufactures paper or paperboard, for example. In this example, cellulose fibers in solution are continuously provided through headbox 162 onto the wire screen or mesh 64 to form the lower layer 37. Next, as the layer 37 travels along the wire 64, a cellulose and polymer particle slurry is continuously fed through the headbox 164 on top of the layer 37 to form the layer 20. Finally, as the layers 37 and 20 travel further along the wire 64, cellulose fibers in solution are continuously provided on top of the layer 20 to form the top layer 36. The undensified layered structure 21 can be fed through one or more dryer rolls 68 to complete the drying of the structure.

In a subsequent densification process, the three layers 36, 20, and 37 which make up the structure 21 can then be bonded, pressed or laminated together to form a densified layered structure 21'. For example, a plurality of heated rolls 66 and 66' can be provided, such as are utilized in a calendar stack. The structure 21 can be pressed and heated between the rolls 66 and 66', to cause the polymer particles to be locked into the structure, and to form the densified structure 21', which can then be collected on a spool 72.

Preferably, the top and bottom layers 36 and 37 are each significantly thinner than the sheet 20, and have a significantly lower basis weight than the sheet 20. For example, the layers 36 and 37 can each be provided at a basis weight of about 35 pounds per 3000 ft$^2$ and the sheet 20 can be provided at a basis weight of about 250 pounds per 3000 ft$^2$. Preferably, each of the layers 36 and 37 contribute between about 10 to 25 percent of the basis weight of the resulting layered structure, with the middle layer contributing between about 50 to 80 percent of the basis weight.

As an alternative to using the layers 37 and 36 to retain the particles 24 within the sheet 20, the manufacturing equipment can be chosen to accommodate particles which may stick to the equipment. For example, the equipment can be provided with blades, such as doctor blades, to periodically scrape material from rolls or other components. Also, the components, such as the dryer rolls for example, may be coated with a non-stick finish, such as Teflon for example, to prevent material from building up. As another alternative, the equipment can use air floatation devices to prevent the sheet material 20 from contacting components. Processing the sheet material 20 at lower heat may also prevent the polymer particles 24 from melting and sticking to the equipment.

Additional Examples

The following numbered samples describe exemplary sheet materials. In particular, samples 1–3 and 5–6 describe inventive absorbent sheet materials having cut-resistant particles. All examples use 0.75% by dry paper weight of Kymene 557LX, a wet strength agent manufactured by Hercules, Inc Sample 1

Southern softwood kraft (SSK) and eucalyptus (Euc) drylap are defribillated in water to produce a slurry. The paper fiber is blended in a ratio of about 75% SSK to 25% Euc. PETG 6763 (from Eastman Chemical) particles, cryogenically ground on an attrition mill to an average particle size of approximately 300 microns, are added to the slurry. The particles are added at about 30% by weight of the total mass (paper+particles). The mixture is then run on a Fourdrinier-type linerboard machine to produce rolls of undensified paper with basis weight of about 320 lb/3000 ft$^2$. The paper is subsequently cut into sheets and subjected to a densification process to improve the cut resistance and shred resistance of the base paper. During this densification process, the sheets are pressed in a hot platen press at 380° F. and 440 psi for 25 seconds.

Sample 2

SSK drylap is defibrillated in water to produce slurry A. SSK and eucalyptus drylap are defribillated in water to produce slurry B. The paper fiber of slurry B is blended in a ratio of about 75% SSK to 25% Euc. PETG 6763 particles (from Eastman Chemical), cryogenically ground on an attrition mill to an average particle size of approximately 300 microns, are added to slurry B. The particulate material is added at about 38% by weight of the total mass (paper+particulate) in slurry B. A three-ply product is produced with the top and bottom layer produced from slurry A and the middle layer produced from the particulate loaded slurry B. Rolls of undensified three-ply paper are produced with a total basis weight of about 320 lb/3000 ft$^2$, where the top and bottom layers each have a basis weight of about 35 lb/3000 ft$^2$. The overall polymer concentration of the sheet is about 30% (by weight). The paper is subsequently cut into sheets and subjected to a densification process to improve the cut resistance and shred resistance of the base paper, wherein the sheets are pressed in a hot platen press at 380° F. and 440 psi for 25 seconds.

Sample 3

SSK and eucalyptus drylap are defribillated in water to produce a slurry. The paper fiber is blended in a ratio of about 75% SSK to 25% Euc. PETG 6763 particles (from Eastman Chemical), cryogenically ground on an attrition mill to an average particle size of approximately 220 microns, are added to the slurry. The particulate material is added at about 30% by weight of the total mass (paper+particulate). The mixture is then run on a Fourdrinier-type linerboard machine to produce rolls of undensified paper with basis weight of about 320 lb/3000 ft$^2$. During a subsequent densification process, the sheets are pressed in a hot platen press at about 380° F. and 440 psi for about 25 seconds.

Sample 4—(Control Sample)

Southern softwood kraft (SSK) and eucalyptus drylap are defribillated in water to produce a slurry. The paper fiber is blended in a ratio of about 75% SSK to 25% Euc. The mixture is then run on a Fourdrinier-type linerboard machine produce rolls of undensified paper with basis weight of about 320 lb/3000 ft$^2$. The paper is subsequently cut into sheets and subjected to a densification process, wherein the sheets are pressed in a hot platen press at about 380° F. and 440 psi for about 25 seconds.

Sample 5

Southern softwood kraft (SSK) and eucalyptus drylap are defribillated in water to produce a slurry. The paper fiber is blended in a ratio of about 75% to 25% SSK to Euc. PETG 6763 particles (from Eastman Chemical), cryogenically ground on an attrition mill to an average particle size of approximately 300 microns, are added to the slurry. The particulate material is added at about 30% by weight of the total mass (paper+particulate). The mixture is then run on a Fourdrinier-type linerboard machine to produce rolls of undensified paper with basis weight of 200 lb/3000 ft$^2$. The paper is subsequently cut into sheets and subjected to a densification process to improve the cut resistance and shred resistance of the base paper. The sheets are pressed in a hot platen press at 380° F. and 440 psi for 25 seconds.

Sample 6

SSK and eucalyptus drylap are defribillated in water to produce a slurry. The paper fiber is blended in a ratio of about 75% SSK to 25% Euc. PETG 6763 particles (from Eastman Chemical), cryogenically ground on an attrition mill to an average particle size of approximately 200 microns, are added to the slurry. The particulate material is added at about 30% by weight of the total mass (paper+particulate). The mixture is then run on a Fourdrinier-type linerboard machine to produce rolls of paper with basis weight of about 165 lb/3000 ft$^2$. The undensified paper is then cut into sheets and subjected to a densification process to improve the cut resistance and shred resistance of the base paper. The sheets are pressed in a hot platen press at about 380° F. and 220 psi for about 25 seconds.

TEST METHODS

The following test methods are utilized for characterizing SAMPLES 1–6:

Absorbency Rate:

The absorbency rate method described above is utilized.

Absorbent Capacity:

The absorbent capacity method described above is utilized.

Absorbent Efficiency:

Absorbent efficiency is calculated as described above.

Slice Testing (Slice or Cut Resistance):

The slice testing method described above is utilized.

Shredding Tests (Abrasion Loss)

The following abrasion loss test methods are adapted from TAPPI standard T476om-97 and utilized to characterize the shredding resistance of SAMPLES 1–6 described above.

Taber Abrasion Loss Test (dry):

1. Cut 4 inch×4 inch square sample with a ¼ inch hole in the center.
2. Mount Catalog No. H-18 TABER® abrasion wheels on TABER® abraser tester. Mount 1000 g weights on parallel arms of TABER® tester.
3. Weigh sample to three decimal points.
4. Mount sample in specimen holder of TABER® tester. Lower the arms and start the turntable. Allow rotation for 100 revolutions at a rotation speed of approximately 70–75 RPM.
5. Remove the sample. Tap the sample on its side to remove any loose fibers on the surface. Weigh the sample to three decimal points.
6. Calculate the unit abrasion loss as (initial weight–final weight). The units are mg$_{material\ lost}$/100 revolutions.
7. Test three–five samples per above.
8. Report average of sample values.

Taber Abrasion Loss Test (wet):

1. Cut 4 inch×4 inch square sample with a ¼ inch hole in the center.
2. Mount Catalog No. H-18 TABER® abrasion wheels on TABER® abraser tester. Mount 1000 g weights on parallel arms of taber tester.
3. Weigh sample to three decimal points.
4. Soak sample in distilled water for thirty seconds.
5. At 30 seconds, the sample is removed from the water and tapped ten times on its side in order to remove any non-absorbed water.
6. Mount sample in TABER® tester. Lower the arms and start the turntable. Allow rotation for 100 revolutions.
7. Remove the sample. Place sample in 140° F. oven to dry overnight. The samples are removed the next day and allowed to condition in the original environment for at least four hours.

8. Weigh the conditioned sample to three decimal points.
9. Calculate the unit abrasion loss as (initial weight–final weight). The units are $mg_{material\ lost}/100$ revolutions.
10. Test three–five samples per above.
11. Report average of sample values.

Sheet materials having cut-resistant particles and made in accordance with the present invention exhibit high absorbency, high cut-resistance, and low abrasion loss. The absorbent efficiency, slice resistance, and abrasion loss for SAMPLES 1–6 are indicated in the table of FIG. 17. As illustrated in FIG. 17, sheet materials made according to principles of the present invention preferably exhibit an absorbent efficiency of at least about 0.2 and a slice resistance of at least about 30 kgf/cm, and more preferably an absorbent efficiency of at least about 1.0 and a slice resistance of at least about 40 kgf/cm. It is preferred that the inventive sheet materials exhibit an absorbent efficiency of at least about 0.2 and that (at least the intended cutting surface of) the sheet material exhibit a wet abrasion loss of less than about 400 mg per 100 revolutions. It is also preferred that the sheet materials of the present invention exhibit an absorbent efficiency of at least about 0.2, a slice resistance of at least about 30 kgf/cm, and a wet abrasion loss of less than about 400 mg/100 revolutions. Even more preferably, the sheet materials of the present invention exhibit an absorbent efficiency of at least 1.0, a slice resistance of at least 40 kgf/cm, and a wet abrasion loss of less than about 400 mg per 100 revolutions. The cutting surface of such a material also preferably exhibits a dry abrasion loss of less than about 300 mg per 100 revolutions and more preferably less than about 200 mg per 100 revolutions.

As also shown in the examples of FIG. 17, it is preferred that the absorbent material within the sheet is provided in amounts of at least 50 percent by weight, in order to provide good absorbency, and that the cut-resistant particles are provided in an amount of between about 10 percent and about 50 percent by weight of the sheet. The sheet material also preferably has a relatively high basis weight. For example, weights of at least 100 pounds per 3000 ft$^2$ (0.016 g/cm$^2$) are preferred to provide adequate cut-resistance and absorbency. More preferably, the basis weight of the sheet material is at least 165 pounds per 3000 ft$^2$ (0.027 g/cm$^2$) and most preferably the basis weight of the sheet material is at least 300 pounds per 3000 ft$^2$ (0.049 g/cm$^2$). Also, the sheet material preferably has a thickness t of between about 250 microns (0.01 inch) and about 1250 microns (0.05 inch) to provide adequate cut-resistance and absorbency. The particles in the inventive sheet material preferably comprise a polymeric material, and preferably have an average size of at least about 100 micrometers (microns), and most preferably between 200 micrometers and 500 micrometers.

The foregoing examples and descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, systems, configurations, methods, and potential applications have been described, it should be understood that many variations and alternatives could be utilized without departing from the scope of the invention. For example, as alternatives to the polymer particles and support systems described above, other additives could be utilized to provide cut and/or shred resistance, such as chemical additives for instance.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that such modifications fall within the scope of the invention as defined by the claims appended hereto.

What is claimed is:

1. A multi-purpose sheet material comprising:
   (a) an absorbent layer having opposing first and second surfaces;
   (b) a cut-resistant material in contact with said absorbent layer;
   wherein said cut-resistant material comprises a cut-resistant support system;
   wherein said cut-resistant support system comprises a discontinuous array of discrete elements formed on said absorbent layer; and,
   wherein said sheet material exhibits an absorbent efficiency of at least about 0.2 and a slice resistance of at least about 30 kgf/cm.

2. The sheet material of claim 1, wherein said cut-resistant material has opposing first and second surfaces, wherein said first surface of said cut-resistant material is in contact with said first surface of said absorbent layer, and wherein said sheet material further comprises a substantially fluid-impervious barrier layer substantially continuously covering either of said second surfaces.

3. The sheet material of claim 1, wherein said absorbent layer comprises a fibrous material.

4. The sheet material of claim 1, wherein said discrete elements are particles.

5. The sheet material of claim 4, wherein said particles have an average size of at least about 100 micrometers.

6. The sheet material of claim 1, wherein said said sheet material has a thickness from between about 250 micrometers to about 1270 micrometers.

7. A multi-purpose sheet material comprising:
   (a) an absorbent layer having opposing first and second surfaces; and
   (b) a cut-resistant support system in contact with said absorbent layer;
   wherein said support system comprises a continuous array formed on said absorbent layer; and,
   wherein said sheet material exhibits an absorbent efficiency of at least about 0.2 and a slice resistance of at least about 30 kgf/cm.

8. The sheet material of claim 7, wherein said sheet material exhibits an absorbent efficiency of at least about 1.0 and a slice resistance of at least about 40 kgf/cm.

9. The sheet material of claim 7, said cut-resistant material has opposing first and second surfaces, wherein said first surface of said cut-resistant material is in contact with said first surface of said absorbent layer, and wherein said sheet material further comprises a substantially fluid-impervious barrier layer substantially continuously covering either of said second surfaces.

10. The sheet material of claim 7 wherein said absorbent layer comprises a fibrous material.

11. The sheet material of claim 7 wherein said support system comprises a synthetic material.

12. The sheet material of claim 7 wherein said cut-resistant support system comprises a substantially non-absorbent layer having holes.

13. The sheet material of claim 7 wherein said cut-resistant support system is selected from the group consisting of layers, particles, fibrous materials, and combinations thereof.

14. An absorbent and cut-resistant article comprising:
(a) a cut-resistant layer having opposite first and second surfaces; and
(b) an absorbent material in contact with said cut-resistant layer;
wherein said cut-resistant layer comprises a cut-resistant support system;
wherein said absorbent material comprises a discontinuous array formed in said cut-resistant layer; and,
wherein said article exhibits an absorbent efficiency of at least about 0.2, a slice resistance of at least about 30 kgf/cm, and a wet abrasion loss of less than about 400 mg per 100 revolutions.

15. The article of claim 14 wherein said cut-resistant layer defines an essentially continuous network having a plurality of discrete compartments therein.

16. The article of claim 14, wherein said article exhibits a dry abrasion loss of less than about 300 mg per 100 revolutions.

17. The article of claim 16, wherein said article exhibits a dry abrasion loss of less than about 200 mg per 100 revolutions.

18. The article of claim 14, wherein said article has a basis weight of at least about 100 pounds per 3000 ft$^2$.

19. The article of claim 15, further comprising:
(c) a thin absorbent layer attached to said cut-resistant layer.

20. The article of claim 14, wherein said cut-resistant support system comprises at least two different materials.

* * * * *